United States Patent [19]

Crosby, Jr. et al.

[11] Patent Number: 4,750,111
[45] Date of Patent: Jun. 7, 1988

[54] COMPUTER SYSTEM FOR PROCESSING ANALOG AND DIGITAL DATA

[76] Inventors: Edward D. Crosby, Jr., 250 Fox Hill Rd., Burlington, Mass. 01803; Stephen A. Marsh, 3 Duane Dr., North Reading, Mass. 01864; Larry A. Coates, 31 Durham Ave., South Hamilton, Mass. 01987

[21] Appl. No.: 643,051

[22] Filed: Aug. 22, 1984

[51] Int. Cl.⁴ .......................................... G06F 13/00
[52] U.S. Cl. ................................................ 364/200
[58] Field of Search ... 364/200 MS File, 900 MS File; 371/71, 68, 24, 25

[56] References Cited

U.S. PATENT DOCUMENTS

| | | | |
|---|---|---|---|
| 3,993,981 | 11/1976 | Cassarino | 364/200 |
| 4,064,392 | 12/1977 | Desalu | 364/300 |
| 4,257,099 | 3/1981 | Appelt | 364/200 |
| 4,325,147 | 4/1982 | Rothlauf | 370/91 |
| 4,370,708 | 1/1983 | Bruce et al. | 364/200 |
| 4,442,504 | 4/1984 | Dummermuth | 364/900 |

OTHER PUBLICATIONS

Sellers, "Error Detecting Logic for Digital Computers" 1968, McGraw Hill, pp. 207-211.

*Primary Examiner*—David Y. Eng
*Attorney, Agent, or Firm*—Robert T. Dunn

[57] ABSTRACT

A computer system for processing analog and digital data input signals from many sources and producing analog and digital data output control signals includes a plurality of digital processing devices for processing the input data, a Processor Bus that interconnects the processing devices for relatively very high speed data transmission between the processing devices a plurality of analog and digital input and output data converter modules, a Converter Bus that interfaces the converter modules and a controller device that couples the Processor Bus and the Converter Bus together and controls the flow of signals therebetween, whereby analog and digital input data received at a range of data rates from relatively low to relatively high rates by input converter modules is transmitted on the Converter Bus to the Processor Bus, via the controller device, in digital format and is processed in the digital format at relatively very high data rates by one or more of the processing devices and digital output data from the processing devices is transmitted on the Processor Bus to the Converter Bus via the controller device and is converted by the converter modules which produce system outputs.

20 Claims, 19 Drawing Sheets

FIG. 3: PROCESSOR BUS SYNCHRONIZATION AND TIMING

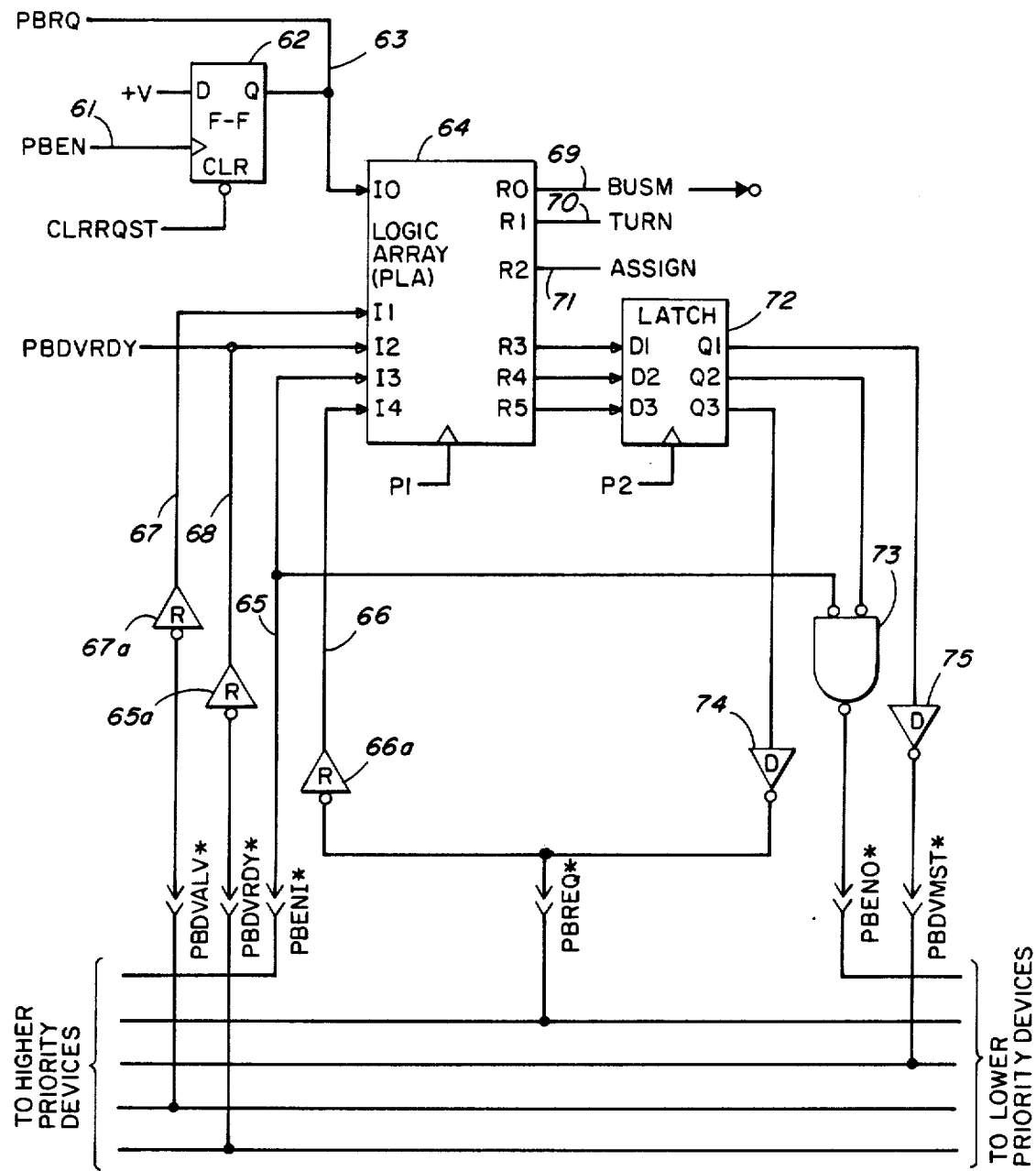
FIG. 6: BUS ACQUISITION/MASTER LOGIC CIRCUIT

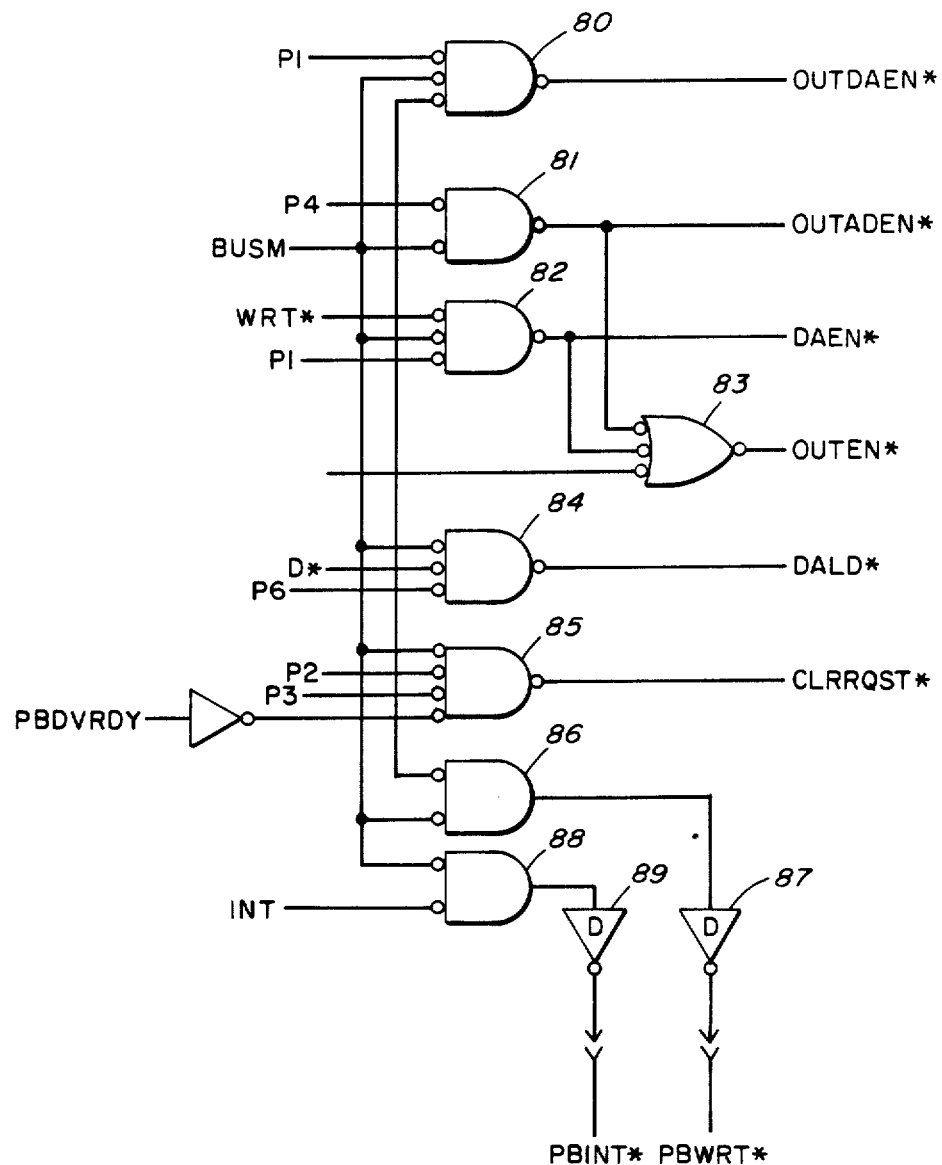
FIG. 7: BUS CONTROLLER LOGIC CIRCUIT

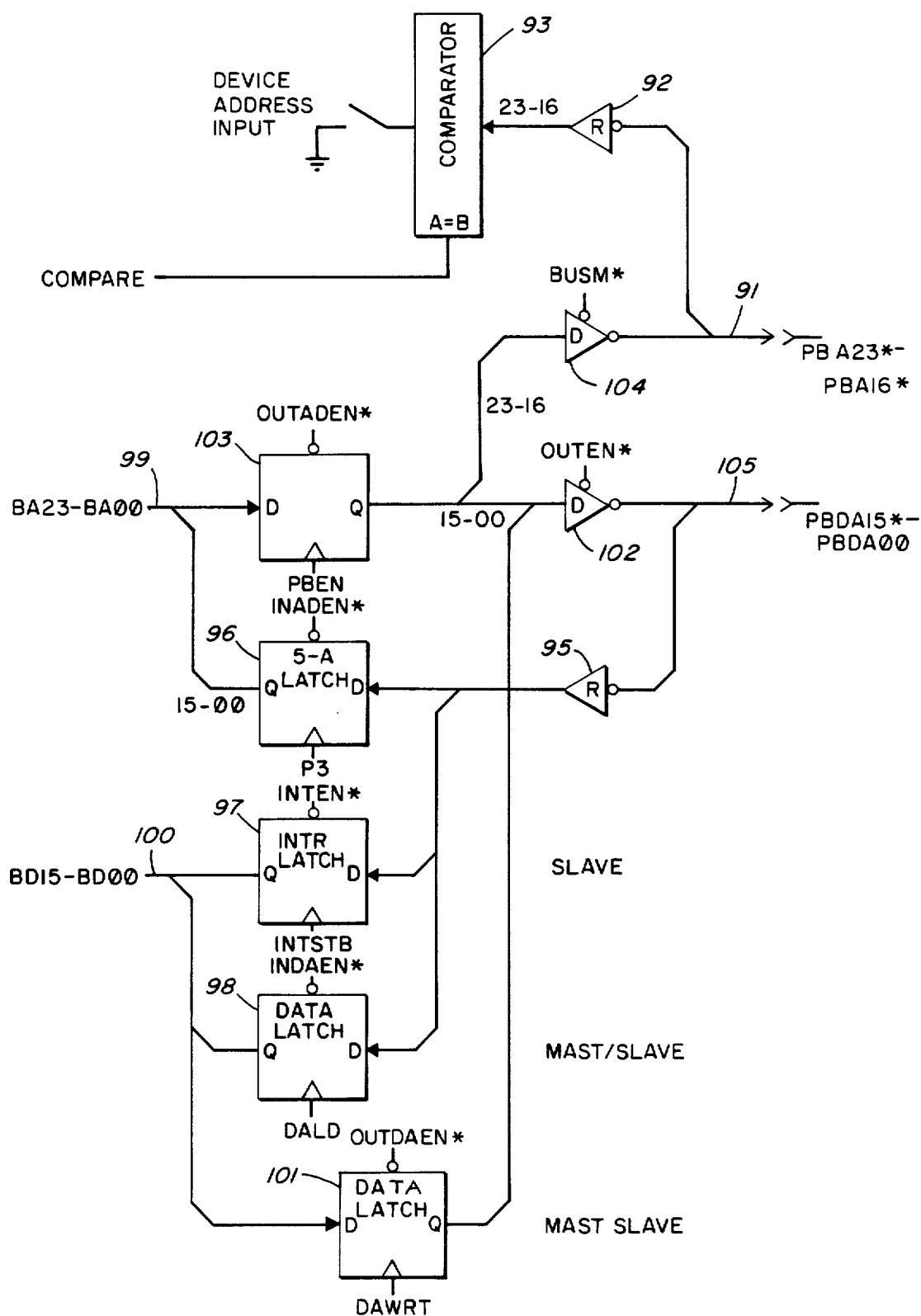
FIG. 8: BUS TRANSFER INTERFACE CKT

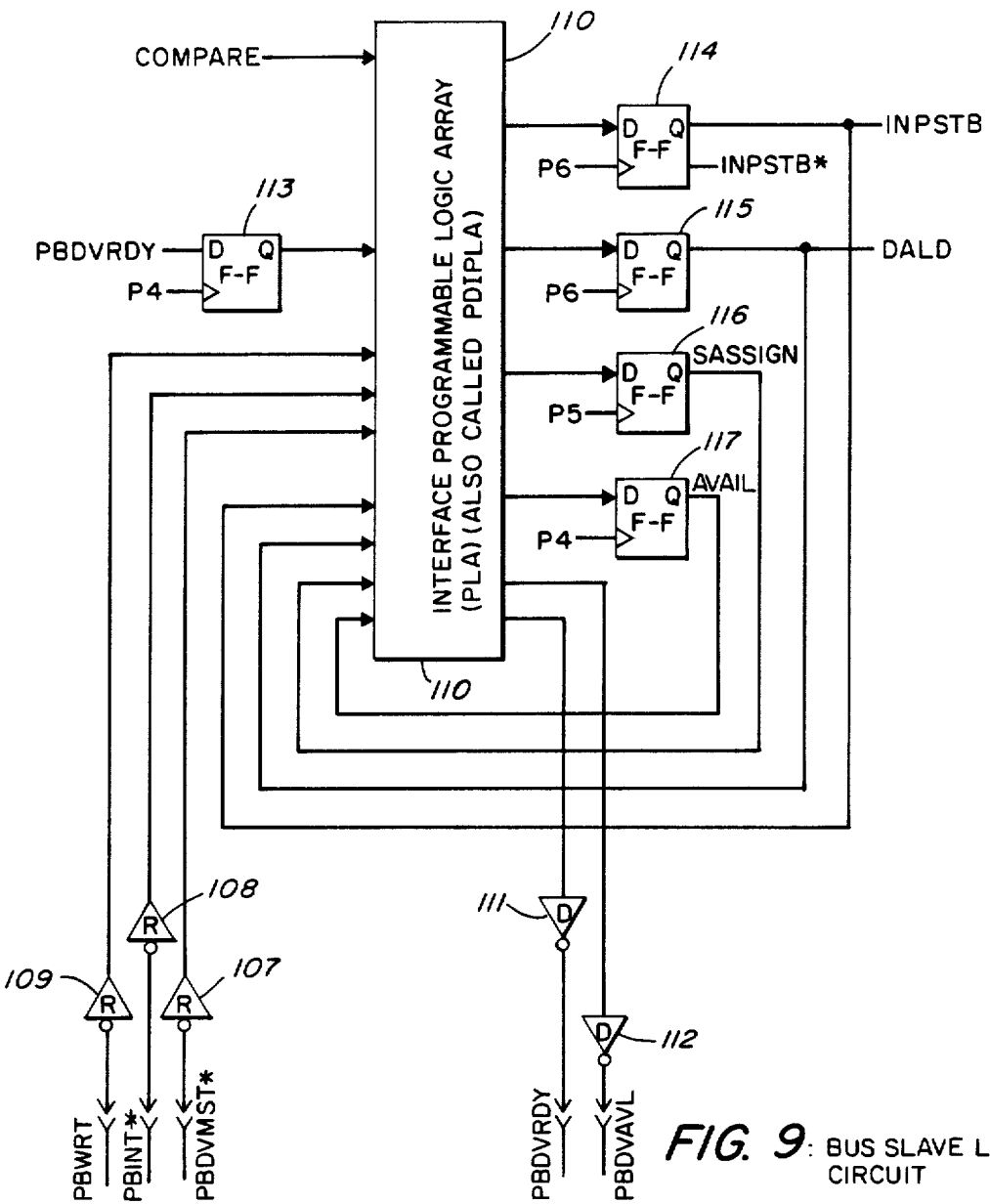
FIG. 9: BUS SLAVE LOGIC CIRCUIT
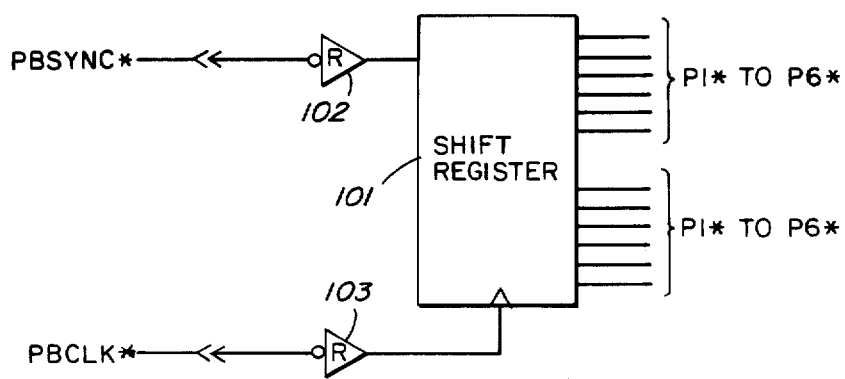
FIG. 10: BUS TIMING CKT

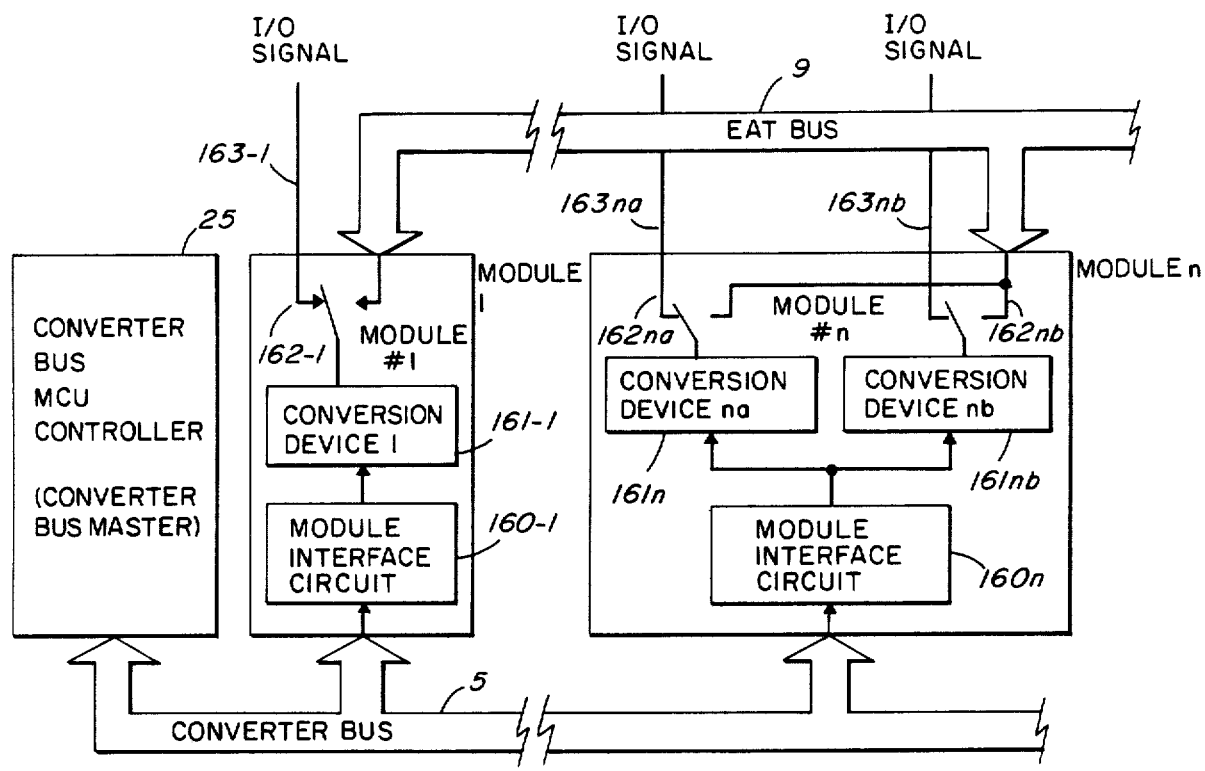
FIG. 11: CONVERTER BUS SYSTEM
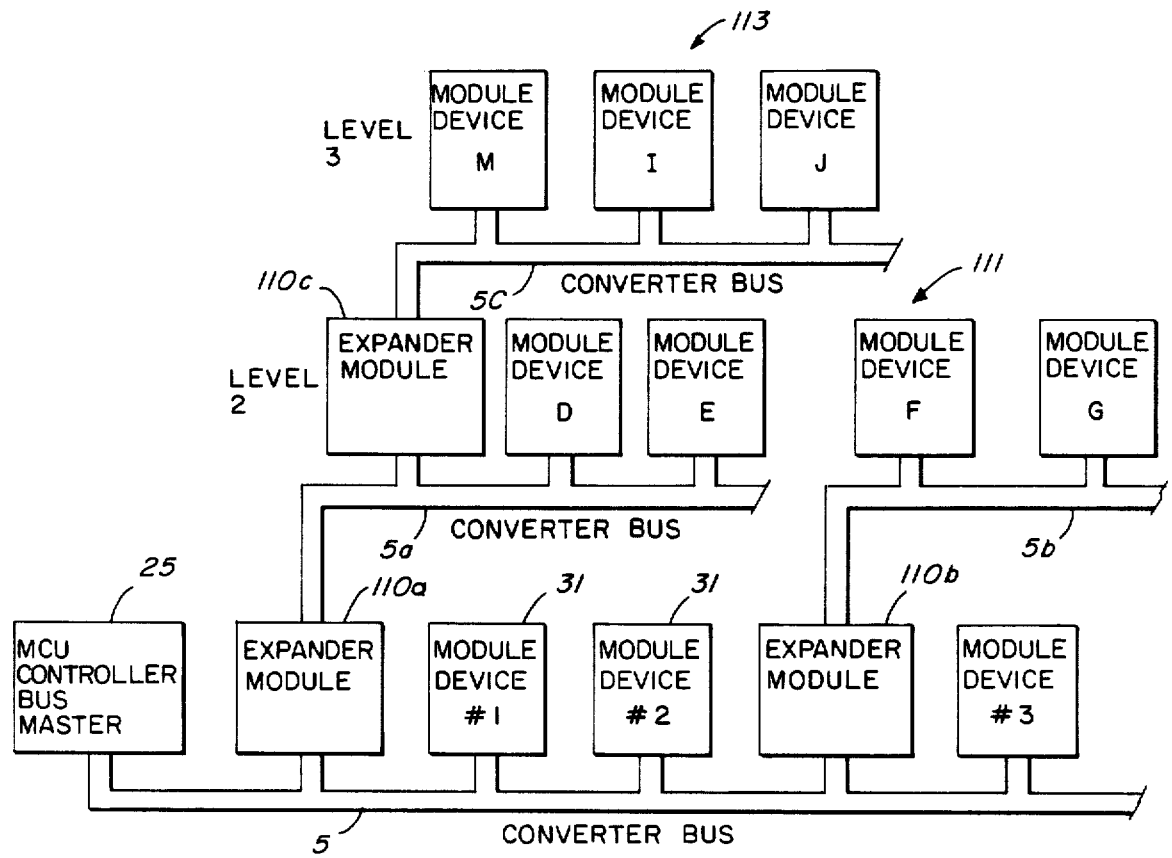
FIG. 12: EXPANDER CONFIGURATION

CONVERTER BUS
BASIC TIMING CYCLE

CONVERTER BUS TIMING

WRITE CYCLE SIGNALS

READ CYCLE TIMING

BLOCK WRITE/BLOCK READ TIMING

INTERRUPT ACKNOWLEDGE CYCLE

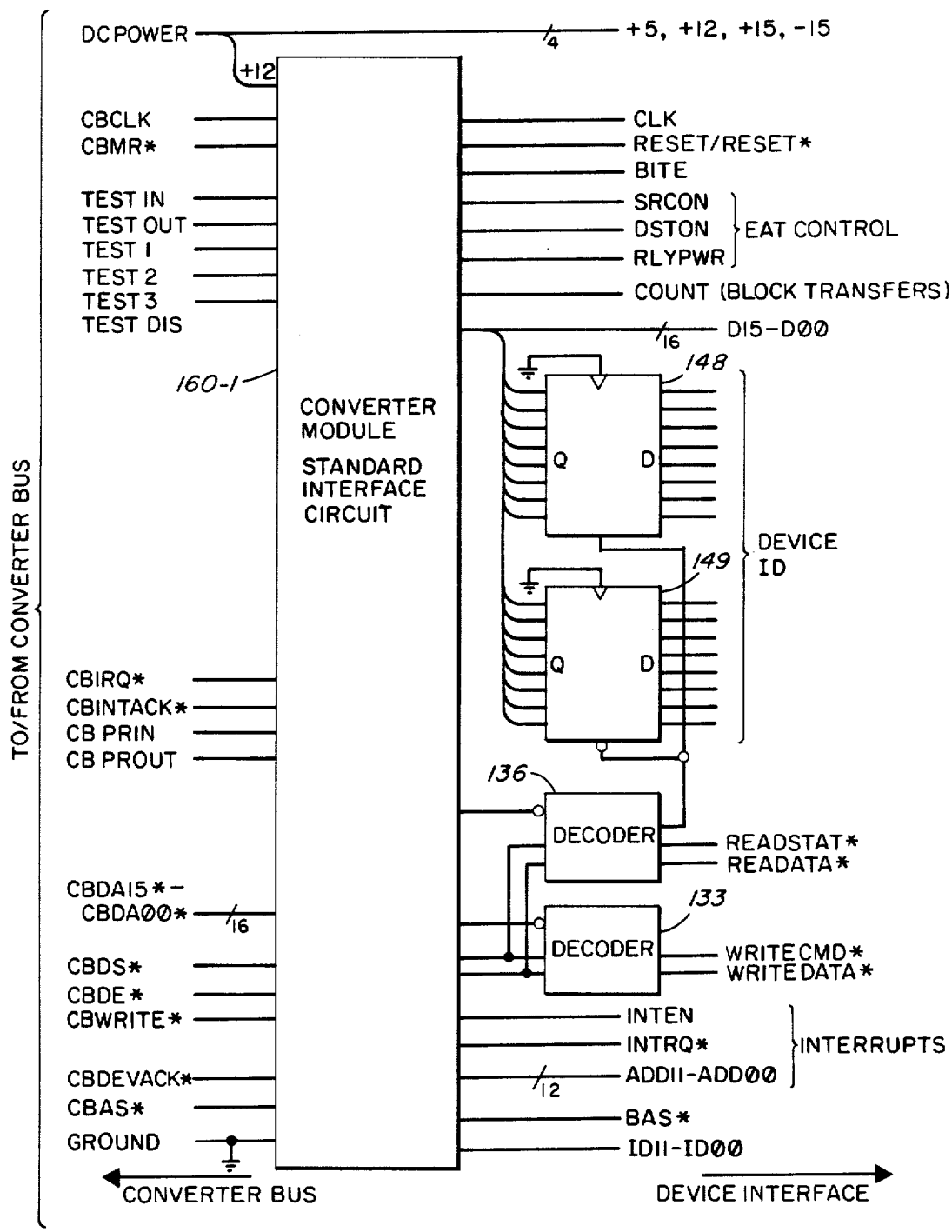
FIG. 19: CONVERTER BUS INTERFACE CIRCUIT

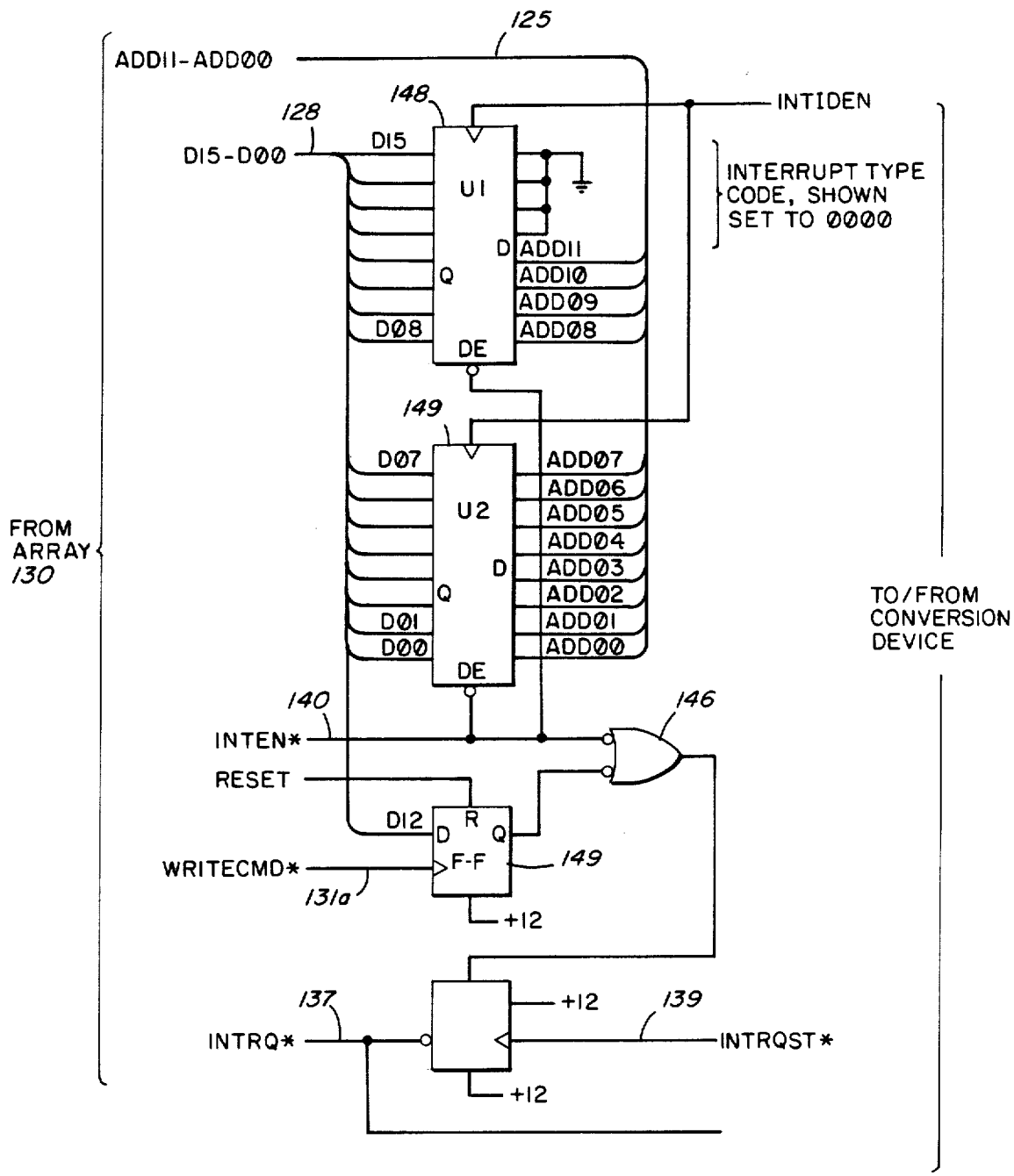
FIG. 21: INTERRUPT INTERFACE

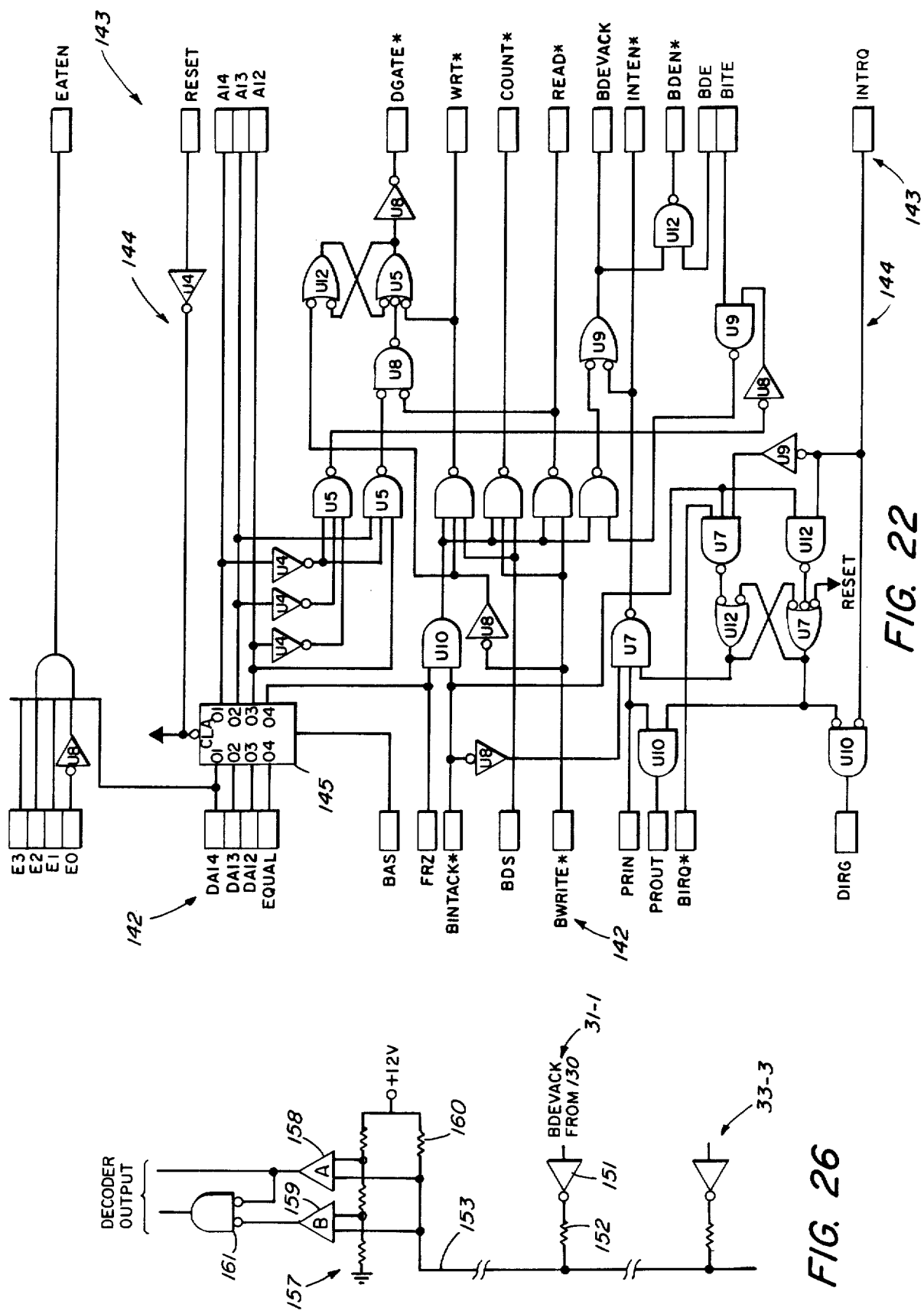

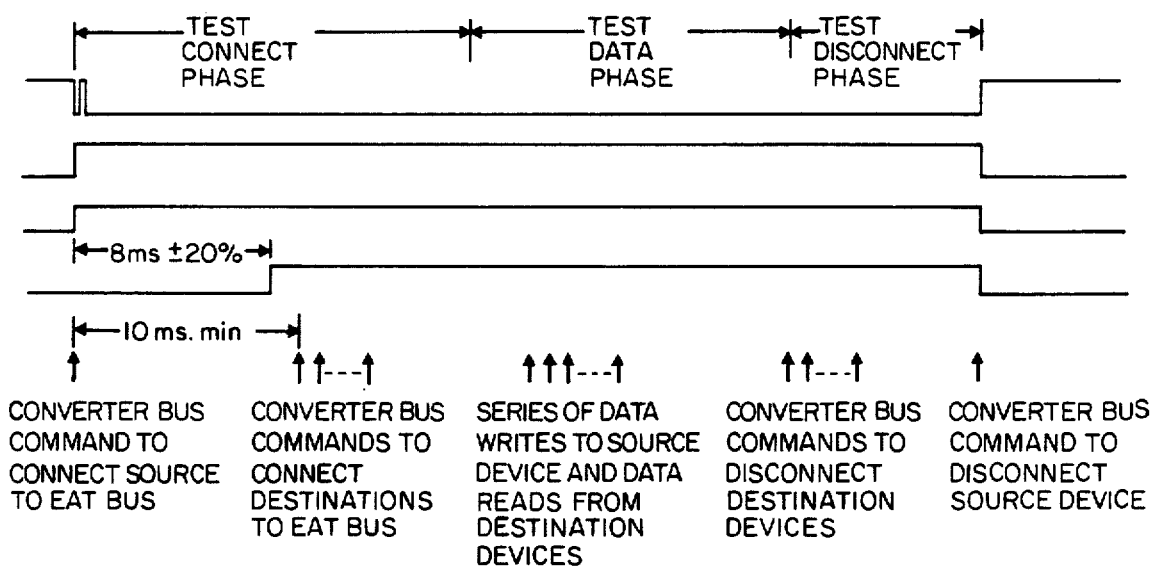
FIG. 23: EAT BUS TIMING
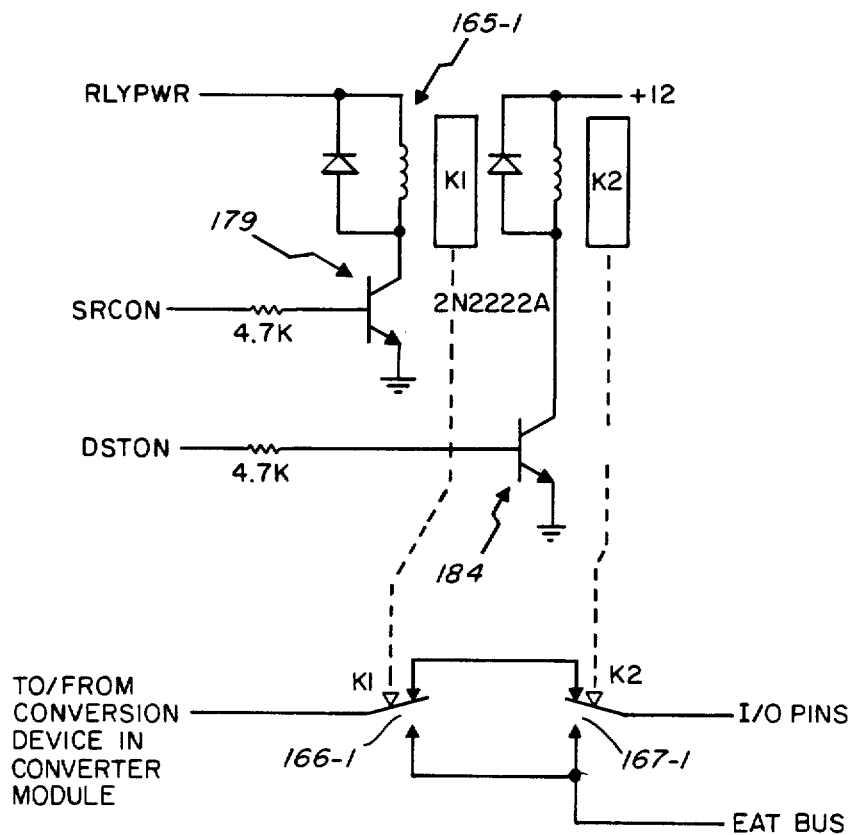
FIG. 24: EAT BUS RELAY SWITCHES

COMPUTER SYSTEM FOR PROCESSING ANALOG AND DIGITAL DATA

BACKGROUND OF THE INVENTION

This invention relates to computer systems for processing analog and digital data from a multitude of sources, received at a wide range of input data rates and processed at very much higher speed according to readily variable programs.

State-of-the-art process controls, data acquisition, simulation, or training systems require custom data acquisition and control units to process analog and digital data. The data acquisition and control units must be reliable and flexible. The present invention is such a system incorporating an internal data communication technique for custom data acquisition and control equipment that has the following features:

1. A standard internal architecture that can be used for many different applications;
2. Can interface a large number of analog and digital data input and output converters (this capability is referred to herein as "fanout");
3. Can be expanded easily to accomodate a specific task;
4. Accomodates a mix of relatively high data rate and low data rate input and output data converters;
5. Accepts and processes the input and output data at relatively much higher data rates than the rate that the data is input and output;
6. Can be custom configured for a specific task with minimum design time and expense;
7. Is programmable with software;
8. Has built in an extensive self-test and fault diagnostic capability; and
9. Has built in a data error correcting capability.

In the past, there has been two approaches to data acquisition and control equipment design. According to one of these, custom-designed units are configured to process a defined fixed set of input and output (I/O) signals. Each of these custom equipments is different and has its own custom designed, hard-wired logic which is optimized for one particular application. The shortcomings of this approach are:

It is time-consumsing and expensive, because the equipment must be redesigned for each application; and The equipment cannot be expanded or re-configured; and The equipment does not have a standard internal architecture.

According to another prior approach, equipments are based on bus-oriented, modular design. In general, these equipments feature a series of standardized modules that interface to a defined, standard digital communication bus on which all module-to-module data is transferred. Some equipments are a combination of two or three buses that enable the system to support different types of modules. Typically, one bus handles high data rate processing modules while another handles low date rate processing modules. None of these prior techniques address the total problem and all have serious shortcomings. None provide the features listed above that are included in the applicant's system. The limitations of the prior techniques vary from equipment to equipment and include the following general problems:

Inadequate fanout and expansion capability so they cannot support large systems;

Limited internal self-test capability;

Not easily programmed for different system requirements;

Inadequate high-speed data transfer capability, i.e. the high-speed bus does not have sufficient direct memory access (DMA) data rates and/or it cannot support multiple high-speed simultaneous data transfers;

Cannot handle a mix of modules operating at different data rates; and

There is no provision for data error correcting.

It is an object of the present invention to provide a computer system incorporating the above numbered features while avoiding the limitations of prior systems.

SUMMARY OF THE INVENTION

The present invention incorporates a system architecture and internal bus design that provides the above numbered features and is not subject to the limitations of prior data acquisition, processing and control systems.

According to the present invention, a uniform architecture is provided that is easily reconfigured and expanded. It incorporates a bus-oriented design, that is referred to herein as: Bus-Oriented Synchronous System (BOSS). The BOSS architecture is comprised of a combination of three bus designs referred to herein as: BOSS Processor Bus, BOSS Converter Bus, and BOSS EAT (End-Around Test) Bus. The Processor and Converter Buses handle all the data transfers from module to module of the system and the EAT Bus accomodates self test and fault isolation of the input and output converter modules.

The BOSS architecture accomodates a total system that may include two or more BOSS subsystems, each including a Processor Bus, several Converter Buses and EAT Buses servicing the Converter Buses. Two such subsystems A and B are shown in FIG. 1 and are coupled by an Interprocessor Bus so that the I/O conversion devices of one subsystem can be accessed by the processor devices of the other subsystem.

Each BOSS Bus of the system is optimized for a particular type of data transfer and the combination of these three buses represents an optimal solution to the problems of data acquisition and control equipment design. The BOSS Processor Bus is optimized for multi-master, high-speed data transfer and satisfies the requirement that the equipment accomodate a highly diverse mix of processor devices and support efficient intermodule data transfers. The BOSS Processor Bus may also have the capability to detect and correct single-bit data errors. It is a particular object herein to provide a system of such multi-master, high speed processor devices on a processor bus wherein each device generates all control, address and data for it to become master of the bus subject to an intrinsic priority designation and so that it can transmit data to and receive data from other processor devices on the bus. It is a further object to provide each processor device the capability to interrupt control of the bus by another device when such interruption would make more efficient use of the bus.

The BOSS Converter Bus is optimized for high noise immunity, and large fanout. It has the capability for extremely high fanout and can interface an essentially unlimited number of analog and digital input and output converter modules. It is another particular object herein to provide a controller device that interfaces to such a Converter Bus and to a high speed multi-master system for receiving requests from masters in the high speed system and scheduling and transmitting responses from the slave converter modules on the Converter Bus.

The BOSS EAT Bus connects complementary input and output converter module types together internally. This Bus provides the ability for extensive internal self-test and fault isolation at the input and output modules. It is a particular object herein to provide means for automatically testing complementary converter-type modules so that each, in effect tests the other.

Thus, the Bus-Oriented Synchronous System (BOSS) incorporates a unique system architecture and bus-oriented design. The architecture is most suitable for systems of large interface, for data acquisition and control of equipment and systems that must handle a great many analog and digital inputs and outputs.

The BOSS architecture represents a significant departure from the prior equipment architecture in that three different types of analog and digital buses are integrated to form an expandable, flexible system that can handle a wide range of data processing requirements. Rather than using a single, multiple purpose bus that may not be optimum for all types of data transfer, the BOSS architecture combines two types of buses of different capabilities including a bus optimized for high speed digital data transfer (the Processor Bus) and a simple, low pinout bus optimized for high fanout and medium to low speed digital data transfer (the Converter Bus). In addition, the system may also include End-Around-Test (EAT) Buses that connects complementary input and output converter modules. In the specific embodiment of BOSS, described herein, the BOSS Processor Bus is a high speed digital bus with a clock rate of 10 megahertz (MHz) that connects the high speed throughput system components together. It provides the fundamental communication path between the system processor devices and the rest of the system. Interfaced to the Processor Bus and the Converter Bus are controllers which are microprocessor control units (MCU's) that control all data flow between the Processor and Converter Buses and so control data flow between the slower analog and digital input and output (I/O) data converter modules and the high speed processor device. In the process of transfer of data between the processor devices and the converter modules, commands are initiated by a processor device to a converter module. In that process, the processor device is sometimes referred to herein as the "master" and the converter module as the "slave".

In the specific embodiment, a BOSS EAT Bus is provided. It is an analog bus that connects all complementary analog data input and output converter modules together so that each converter module has the capability to switch its input or output to the EAT Bus in response to a command received on the Converter Bus. In this way, means are provided for testing complementary analog input and output modules.

In a preferred embodiment, implementation of the Processor Bus interface in each processor device is divided into five sections that perform the following functions for the device: bus timing, bus acquisition/master logic, bus controller, data interface and slave logic. Only two signals are needed from the system clock, clock pulses and sync pulses, and they are provided by the system clock to the bus. The processor device interface circuits (performing the above functions) carries out and obeys all required protocol in the course of addressing and being addressed by other processor devices and in addressing converter modules via the MCU controller.

DESCRIPTION OF THE DRAWINGS

FIG. 6 is an electrical block diagram of the bus acquisition/master logic section of the Processor Bus device interface to the bus;

FIG. 7 is an electrical block diagram of the bus controller section of the Processor Bus device interface to the bus;

FIG. 8 is an electrical block diagram of the bus data interface section of the Processor Bus device interface to the bus;

FIG. 9 is an electrical block diagram of the bus slave logic section of the Processor Bus device interface to the bus;

FIG. 10 is an electrical block diagram of the bus timing section of the Processor Bus device interface to the bus;

FIG. 11 is an electrical block diagram of a Converter Bus system showing the principal parts of converter modules and connections to the Converter Bus and the EAT Bus;

FIG. 12 is an electrical block diagram of an expanded Converter Bus system showing several levels of expansion, all reached by one controller or bus master;

FIG. 19 is electrical block diagram showing the standard converter module (except the interrupt interface) as a block, signals from the Converter Bus to the circuit and interface circuit to the Converter Bus signals used by the converting device in the module;

FIG. 21 is an electrical circuit diagram of the standard converter module interrupt interface;

FIG. 22 is an electrical logic gate diagram of the standard converter module interface semi-custom CMOS gate array;

FIG. 23 is a waveform diagram showing EAT Bus timing signals as an aid to understanding EAT Bus operation;

FIG. 24 is an electrical circuit diagram of an EAT Bus relay switch in a converter module;

FIG. 26 is an electrical diagram of the acknowledgement decoder circuit in the MCU controller for determining that one and only one conversion device has acknowledged an address.

DESCRIPTION OF EMBODIMENTS OF THE INVENTION

1.0 BOSS Architecture

Figure 1:
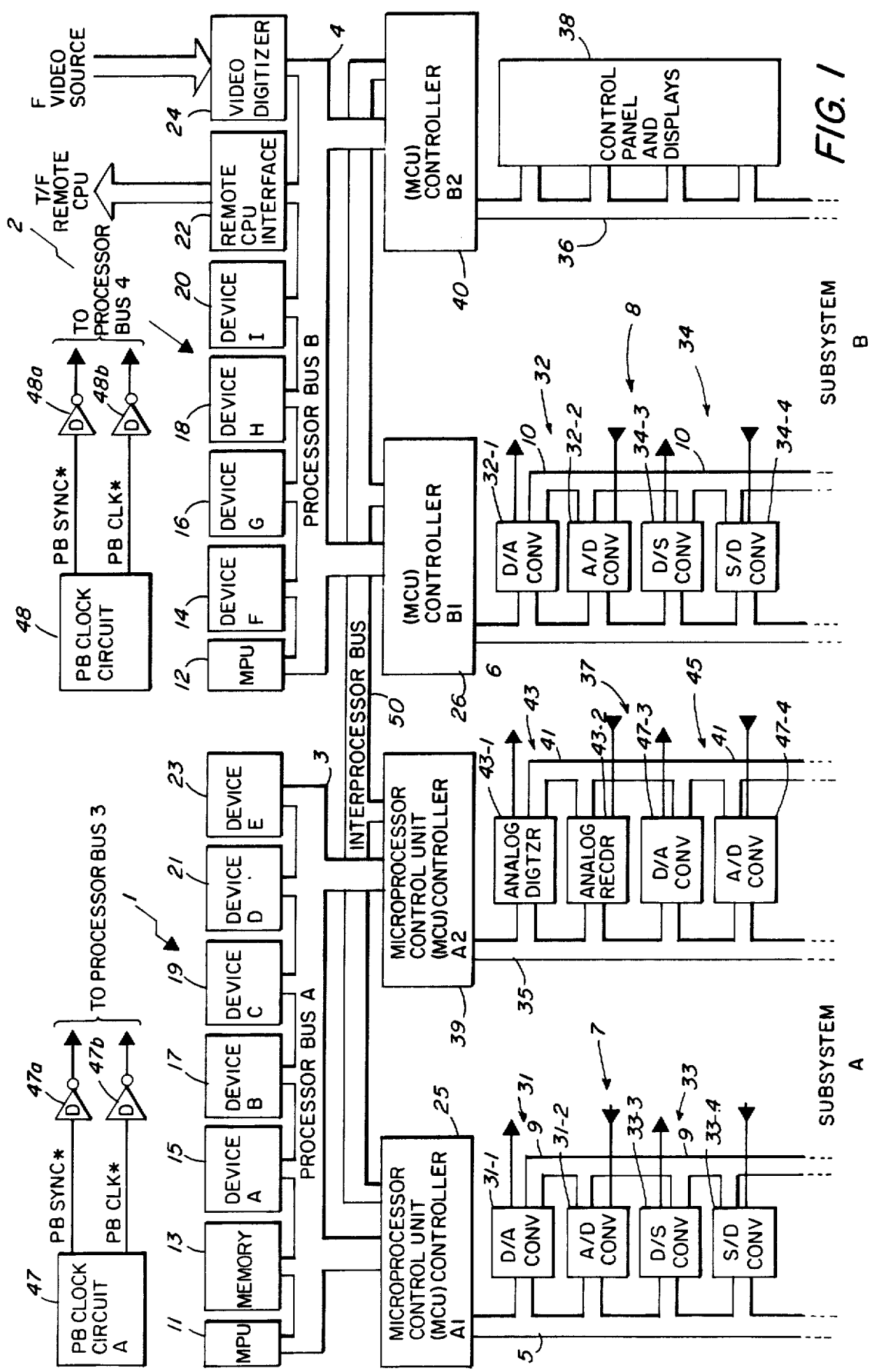
FIG. 1 is a structural block diagram illustrating the architecture of the BOSS System.

An example of the BOSS architecture is shown in FIG. 1. This example highlights the flexibility and expandability of a data acquisition, processing and control system that incorporates the BOSS architecture.

The example in FIG. 1 consists of two typical subsystems, A and B, that are inter-connected via an Interprocessor Bus between the MCU controllers of the two subsystems. This ability to subdivide the overall system into subsystems like A and B allows the system designer to configure the overall system with expandable distributed processing. Systems incorporating the BOSS architecture can be designed to support data processing and throughput requirements that far exceed the data handling capability of any one bus, and yet allows high speed data to be passed between subsystems without requiring additional complex data swappings schemes.

Each of the subsystems A and B in this example has two Converter Buses, each of which is expandable. In practice, many Converter Buses can interface to one Processor Bus by suitable MCU controllers enabling a single subsystem to support many independent Converter Buses. This allows the system designer great flexibility in designing distributed processing functions to maintain overall system data throughput.

As shown in FIG. 1, each of the subsystems A and B is made up of a diverse mix of processor devices and input and output converter modules and each supports high speed interdevice data transfers between processor devices and between processor devices and converter modules. The Processor Bus is optimized for high speed digital data transfer and so it can accomodate the diverse mix of modules of the subsystem. Also, the Converter Buses are optimized for high noise immunity, low power drain, low pinout and large fanout and have the capability of interfacing a large number of input and output converter modules. Each Converter Bus system also includes an EAT Bus that accomodates extensive internal self-test and fault isolation between complementary input and output converter modules. A subsystem (like Subsystem B) may also includes processor devices that interface to other subsystems or to displays, controls or other high speed systems like CPU's and video sources.

Subsystem A includes a mixed set of processor devices 1, a Processor Bus 3 that supports the intermodule data transfers, a Converter Bus 5 to which is coupled several complementary pairs of input and output converter modules 7 and test or EAT Buses 9 interconnecting the complementary input and output converter modules for facilitating self-test and fault isolation between the complementary modules. Among the high speed modules in subsystem A interconnected by the Processor Bus are, for example, microprocessor units (MPU) 11 and 13 and a memory 13 and processor devices A to E, denoted 15, 17, 19, 21 and 23, respectively. A microprocessor control unit (MCU) device, called the Converter Bus controller or master 25 controls all data flow between the the Processor Bus 3 and Converter Bus 5 of subsystem A.

Subsystem A may also include additional Converter Buses and input and output modules. A second Converter Bus 35 accessing complementary pairs of input and output modules 37 is coupled to Processor Bus A by MCU controller 39 and the complementary modules thereof are interconnected by EAT Bus 41.

The number of input and output modules in the converter set, such as 7 or 37, that couple to a Converter Bus is essentially unlimited. For purposes of example here, two pairs of complementary modules are shown on each Converter Bus. For Bus 5, the pairs 31 and 33 include digital to analog (D/A) converter 31-1 (an output) and analog to digital (A/D) converter 31-2 (an input) and digital to synchronous (D/S) converter 33-3 (an output) and synchronous to digital (S/D) converter 33-4 (an input). For Converter Bus 35, the pairs 43 and 45 include analog digitizer 43-1 and analog recorder 43-2 that have specific functions. The analog digitizer digitizes analog input signals and the analog recorder receives digital signals from the converter bus and converts them to analog output signals. The analog signals may be, for example voice messages that are fed into the system, digitized and stored in a processor module (such as memory 13) and later, when called for, fed from the memory to the recorder 43-2 where they are converted back to analog voice for outside use. The other pair 45 may be D/A converter 45-3 and A/D converter 43-4.

The EAT Buses 9 and 41 carry signals between their respective input and output converter modules and facilitates internal testing and fault isolation as is described more fully hereinbelow.

Subsystem B includes a mixed set of processor devices and is capable of high speed data transfers between the processor devices. For example, the set of processor devices in subsystem B, denoted 2, all tie into the subsystem Processor Bus 4 which is coupled to several Converter Buses, like 6 and 36, each servicing a large number of inputs and outputs. These inputs and outputs include the complementary input and output converter modules of set 8 on Bus 6 that are interconnected by the EAT Bus 10 which provides for the internal self-test and fault isolation of those inputs and outputs as is described more fully hereinbelow.

The mix of processor modules in subsystem B includes an MPU 12, devices F, G, H and I, denoted 14, 16, 18 and 20, respectively, a remote central processor unit (CPU) interface 22 and video digitizer 24. MCU controller 26 interconnects the subsystem B Processor and Converter Buses, 4 and 6, and controls data flow therebetween. MCU controller 40 controls data flow between the Processor Bus 4 and a control panel and/or displays 38 via another Converter Bus 36. The processor device 22 processes the interface formats of data flow to and from the devices and modules of subsystem B and the remote CPU (not shown). The video digitizer 24 receives an analog video input from a video source (not shown) and digitizes that analog video input for use in the system.

The input and output converter modules in the set 8 of subsystem B include, for example, D/A output converter module 32-1 and A/D input module 32-2 which are complementary modules. Set 8 may also include D/S output module 34-3 and S/D input module 34-2. As elsewhere, these modules are complementary input and output modules and enable the system to accomodate synchronous data input and to feed synchronous data to outside devices. Both of these pairs of complementary input and output modules are coupled to a test or EAT Bus 10 which enables automatic self-testing and fault isolation as described more fully hereinbelow.

The two subsystems A and B are coupled together via the MCU controllers 25, 39, 26 and 40 and the Interprocessor Bus 50. For this purpose the MCU controllers insure compatibility of signal formats, addresses, etc. of signals flowing between two subsystems A and B. The operation of a typical MCU controller is described more fully hereinbelow with reference to FIG. 25.

Thus, the devices and modules of subsystems A and B include a highly diverse mix of processing, controlling, storing, and converting devices for handling a wide range of kinds of data and speeds of data that may be digital or analog and for maintaining communication and transfers of the data between the devices and between the devices and modules of the subsystems and between the subsystems. Furthermore, each subsystem includes several Converter Buses that are each capable of serving a large number of input and output converter modules and/or control panels and displays. Also, EAT Buses that connnect complementary input and output converter modules are included where appropriate to provide for internal self-test and fault isolation at the input and output points of the system.

A characteristic of the BOSS design architecture that adds a dimension to system flexibility is that the Processor Bus and Converter Bus both have the same generic bus timing and protocol design that is not intimately tied to any particular interface device or other hardware. All bus timing on both of these buses is synchronous in nature and runs in fixed cycles that is not dependant on any particular device, module or interface. Therefore, the bus timing for any one of the buses can be scaled by simply changing the bus clock rate. Systems can be configured of subsystems like A and B that interconnect many distributed Processor and Converter Buses all running at different speeds. In addition, the different Processor Buses, like A and B, can be implemented in different logic families. For example, a system may include a first subsystem having its Processor Bus implemented in emitter coupled logic (ECL) for high data rates, another subsystem having its Processor Bus implemented in low-power Schottky-type transistor to transistor logic (LSTTL) interfaced to the Processor Bus of the first via a bus interface format device, and both subsystems may have Converter Buses implemented in complementary metal oxide semiconductor (CMOS) module converter devices for low system power drain and so be capable of supporting a large number of relatively low data rate input and output converter modules. Both the ECL and LSTTL implemented Processor Buses may run at very different cycle speeds, but will have the same basic generic bus timing and protocol All timing and control signals in Subsystem A are derived from the subsystem clock 47 that produces signals called PBCLK* and PBSYNC* that drive the Processor Bus 3 and from the bus are fed to all of the processor devices 11, 13, 15, 17, 19, 21 and 23 and to the MCU controller devices 25 and 39. Similarly, in Subsystem B, clock 48 provides similar signals to the Processor Bus 4 in that subsystem.

Each of the Processor Buses 3 and 4 in FIG. 1 is optimized for high data throughput speed and supports multiple bus drivers in the processor devices. When a processor device has control of the Processor Bus to send or receive data, it is herein called the bus master. In addition, the bus protocol is designed to handle very complex inter-device data transfers and transfers between processor devices and converter modules without complex software-controlled bus swapping schemes. This means that each processor device can be programmed without regard to other users on the Processor Bus, i.e. the bus is transparent to each processor device's software. This enables complex custom systems to be configured quickly and easily and perform complex jobs without significant timing or integration problems.

The Processor Bus is designed for microprocessor-based systems. However, it differs significantly from prior conventional computer and microprocessor buses that have an asynchronous bus master that controls the flow of information over the bus and so when they communicate with a slow device (like a converter module herein), the system must wait until the slow device responds. If another device of those prior systems wants control of the bus, it must interrupt the current bus master and ask for control of the bus. Then, the bus master will release the bus when it is ready and the new bus master then takes control of the bus and the bus is run at the speed of the new master. While this prior technique is acceptable for minicomputer and similar systems, it has many shortcomings if used for data acquisition, processing and control equipment. Some of these shortcomings are:

Only one master at a time can control the bus over as many bus cycles as are required to carry out the communication requested by the master, which places a severe limitation on data acquisition systems that have multiple simultaneous inputs of mixed types that must be processed;

The design of multiple master systems requires complex, time consuming bus master transfer schemes;

Asynchronous systems do not utilized inherent system speed, i.e. a microprocessor accesses memory during only one of three or four cycles per insturction, but the memory must be fast enought to be accessed during one cycle. Therefore, the memory is idle 65–75% of the time, if the microprocessor is doing only memory reference instructions. The actual memory availability should be 90–95% of the time.

The BOSS Processor Bus of the present invention is not subject to these shortcomings. It makes possible 100% bus time utilization. The BOSS Processor Bus is a continuous, free-running synchronous bus. In the embodiment described herein, its times are divided into a continous series of bus cycles and so a single 16-bit transfer can take place during each bus cycle. The cycle time is chosen to accommodate the fastest processor device (typically the fast memory device). Typical Processor Bus cycles are 300 to 600 nanoseconds (nS). Each device coupled to the Processor Bus has a bus interface that takes device bus access requests and transfers data during the next available bus cycle. The availability of bus cycles is allocated to any requesting device via a priority scheme. Since the bus speed is much faster than any one processor device, Processor Bus availability is usually immediate. The bus protocol accomodates the slower converter module so that signals to and from the converter modules (via the MCU Controller) do not tie up Processor Bus cycles while processing input and output commands.

An important feature of BOSS is that within one Processor Bus cycle, any processor device can communicate with any other processor device or with a converter module (if the converter module is fast enough) without any consideration for any other devices that may be using the bus at the time. If the requesting processor device (the master) must wait several cycles for the information requested (from the slave), the bus may be used by other devices (which become the master) in the meantime. Furthermore, all processor devices have a standard bus interface that coordinates data transfers without involving complex bus swapping schemes or designating bus masters. This results in a relatively simple system that can handle relatively complex transfers between many processor devices operating at different speeds and between processor devices and the relatively very slow input/output converter modules. This overall bus structure of BOSS allows for fast, efficient multiple transfers of data, because each device can transfer its data directly just as soon as the bus is available to it without requesting bus control from a master processor as in prior systems.

Heretofor, in order to handle high speed devices, prior data acquisition, processing and control equipments have had a bus structure that is too fast and complex to be cost effective in interfacing large numbers of slower data acquisition or control devices. These prior buses are limited in the number of loads that can be connected to an output and so they have poor fanout capability, because of their speed and cannot adequately support large systems. The BOSS Converter Bus is designed to overcome those shortcomings while maintaining a defined structure and protocol and retaining flexibility to interface to many different types of input and output modules. The BOSS Converter Bus is optimized for small connector pinout requirements and high fanout. It features a slower cycle time than the BOSS Processor Bus and has multiplexed address and data lines to reduce pinout requirements. The BOSS Converter Bus is designed to interface to a Converter Bus MCU controller and therefore it requires only a few, simple control lines and has a straight forward bus protocol. Unlike prior conventional bus structures, the BOSS approach results in more input or output signals per converter module printed circuit (PC) board and a minimum of hardware is required on each such PC board to interface to the Converter Bus, resulting in a more efficient and cost effective system.

All complementary pairs of converter modules that interface to the Converter Bus may also interface to an EAT Bus. Each converter module printed circuit (PC) board has connector pins dedicated to Converter Bus, power and ground, I/O signals, and EAT Bus. Using this feature, each complementary converter module pair can be tested by the MCU Converter Bus controller (the Converter Bus master) by converting the Converter Bus digital data to output format, connecting the output signal to the EAT Bus, converting the signal back to digital, and sending the digital data back to the Converter Bus master.

These and other features of the present and other inventions are incorporated in the BOSS System which is the best known embodiment of the present invention. The BOSS System is shown in FIG. 1 and explained fully herein with respect to the FIGS. 1 to 25.

2.0 BOSS Processor Bus 2.1 Introduction

Figure 2:
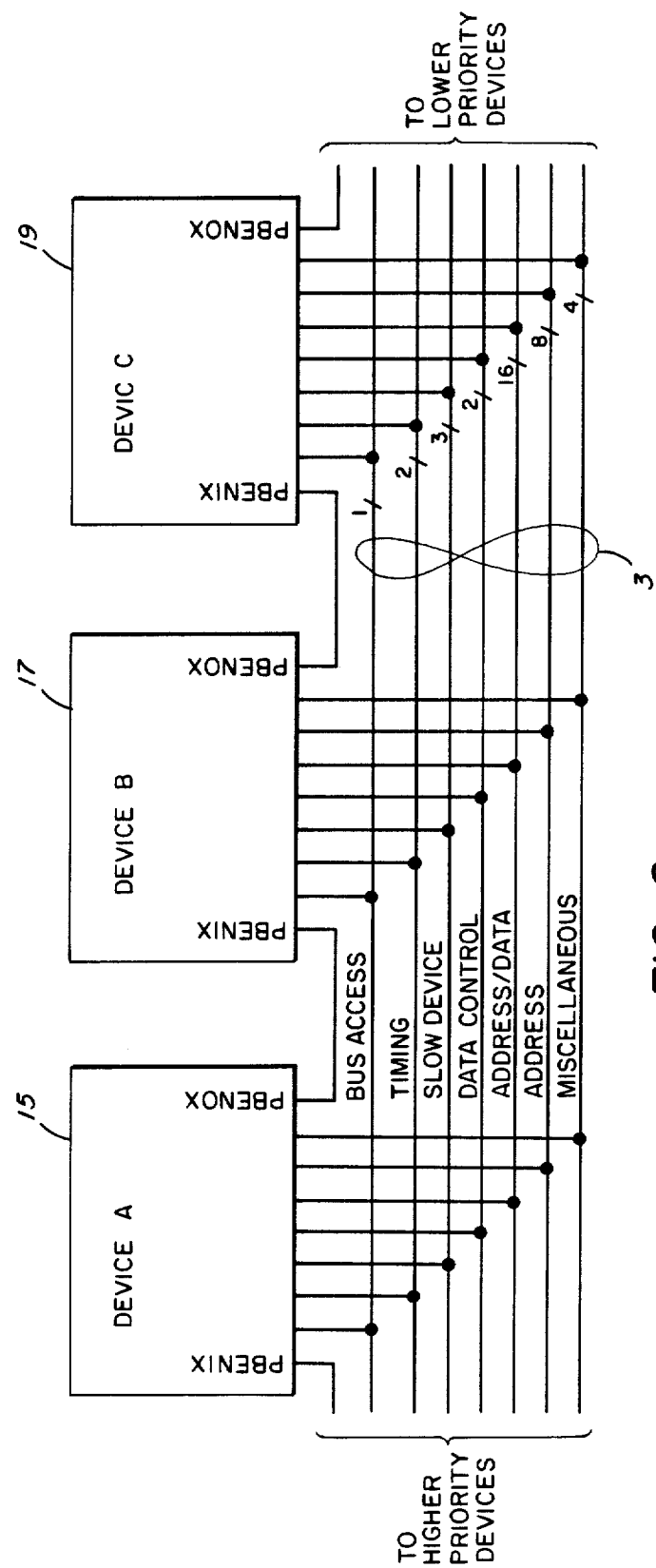
FIGS. 2 is an electrical block diagram showing the Processor Bus and connections to and between three processor devices A, B and C and the enable daisy-chain connections.

The BOSS Processor Bus, is designed to enable high-speed transfer of digital data between many different devices. For example, as shown in FIG. 2, it may have the following:

| | |
|---|---|
| 1 | Bus Access Line; |
| 2 | Timing Lines; |
| 3 | Slow Device Lines; |
| 2 | Data Control Lines; |
| 16 | Address/Data Lines; |
| 8 | Address Lines; and |
| 4 | Miscellaneous Lines. |
| 36 | Total Lines |

Data transfer on the Processor Bus differs from prior processor-oriented buses, because it is a continuously-running synchronous bus. Freerunning bus timing signals PBCLK* and PBSYNC* define fixed length bus cycles. During each cycle a single data transfer can take place. For example, a processor device on a Processor Bus requests bus time by setting a control line. Then, when processor devices with higher priority are not using the bus, the requesting device assigns itself a bus cycle and becomes the bus master that cycle. Using the address, data, and control lines, the requesting device (bus master) identifies the type of transfer and the destination device (slave to the master, via the address lines) and when the slave is ready, the transfer then takes place. During the next cycle, the Processor Bus is released for use by other devices.

The following tables, Table 1 and Table 2, list, group and describe the Processor Bus signals as an aid to following and understanding the operation of the Processor Bus and its operation with the Converter and EAT Buses of the Boss System.

TABLE 1

| Processor Bus Signals | | |
|---|---|---|
| Function | Signals | Quantity |
| Timing | PBCLK* | 2 |
| | PBSYNC* | |
| Bus Access | PBREQ* | 3 |
| | PBENI* | |
| | PBENO* | |
| Slow device Control | PBDVMST* | 3 |
| | PBDVRDY* | |
| | PBDVAVL* | |
| Data Control | PBWR* | 2 |
| | PBINT* | |
| Address/Data | PBAD15*-PBAD00 | 16 |
| Address | PBA23*-PBA16* | 8 |
| Misc | PBDVACK* | 4 |
| | PBPAR* | |
| | PBPERR* | |
| | PBMR* | |
| | | 38 |

TABLE 2

Processor Bus Signal Descriptions

| Signal | Description |
|---|---|
| PBCLK* | This signal is a squarewave clock signal whose frequency is six times the bus cycle frequency. |
| PBSYNC* | A synchronization signal that is low during one clock cycle out of six, thus defining a bus cycle. All processor devices use this signal and PBCLK* in their interface circuits to synchronize all bus activities with other devices. |
| PBREQ* | A device will assert this signal to request access to the bus. A device that is presently the bus master may not assert this signal even though it may need the bus for additional cycles. |
| PBENI* | A daisy chain signal (see FIG. 2). A low signal level will indicate to the receiving device that the bus is available for use on the next cycle. |
| PBENO* | A daisy chain signal (see FIG. 2). A low signal indicates to the next device that the bus is available for use on the next cycle. PBENO* will be asserted by a device only if the device receives PBENI* and the device is not asserting PBREQ*. |
| PBDVMST* | A low signal asserted by the bus master indicates that it was the bus master when the addressed device indicated that it was available on a previous bus cycle. |
| PBDVAVL* | A low signal asserted by the addressed device (the slave) indicates that the addressed device is available for data transfer. |
| PBDVRDY* | A low signal asserted by the addressed device indicates that the addressed device (the slave) has transferred the data to or from (write or read) the bus master. |
| PBWRT* | A low signal asserted by the bus master indicates that the data on the bus is being transferred from the bus master to the addressed device (the slave). |
| PBINT* | A low signal asserted by the bus master indicates that the data word being written should be processed as an interrupt. |
| PBAD00*-PBAD15* | A sixteen bit multiplexed address and data bus. A low signal is logic "1" and a high signal is a logic "0". |
| PBA16*-PBA23* | An eight bit extension of the address bus, thus allowing a total address capability of 24 bits. |

The following four signals are part of the processor bus as implemented but are not required for data transfer and therefore are not part of the bus protocol. The last three signals are used for error recognition.

| | |
|---|---|
| PBMR* | A low signal on this line will force all devices to a quiescent state ("reset"). |
| PDVACK* | A device that recognizes its address will sink a fixed amount of current from this line. By monitoring the total current drawn from this line it can be determined if no device recognized the the address, one device recognized the address or more than one device recognized the address. |
| PBPAR* | Any device placing data on the bus shall put odd parity on this line. |
| PBPERR* | Any device receiving data shall compare the received data parity with PBPAR*. If different it shall assert PBPERR*. |

TABLE 3

Processor Device Interface Internal Signals

| Signals | Descriptions |
|---|---|
| INADEN | Asserted by a device to place the received address on the device internal buffered address lines BA15 to BA00. |
| OUTADEN | Asserted by the bus controller logic circuit causing the data interface circuit to place the sixteen bit address on the input to the multiplexed address/data line driver. It occurs during the time that P1 is high and the device has access to the Processor Bus (BUSM is high). |
| MASSIGN | A bit set by the bus acquisition/master logic circuit indicating that that master has addressed an available device that is not ready. This is the only one of the standard interface circuits that uses this signal as it will cause the circuit to assert PBMST the next time it addresses that device. |
| SASSIGN | A bit set by the bus slave logic circuit in response to another bus master. It is set when the device is available, but not ready to complete the data transfer. Once set, the bus slave will expect PBMST to be asserted on any successive transfers. |
| AVAIL | Set by the bus slave logic circuit that indicates that the device is available to perform a transfer to/from the bus master. When a device is addressed by another device it will return the signal PBDVAVL. |
| BUSM | Set by the bus acquisition/master logic circuit on the rising edge of P1. It indicates that the device is now master and can uset the bus for one cycle. |
| COMPARE | Produced in the bus data interface circuit indicating that the device recognizes its address. |
| INDAEN | Asserted by a device that places the received data on the device internal date bus (BD15 to BD00). |
| OUTDAEN | Asserted by the bus controller circuit that places data to be written to the Processor Bus on the inputs to the multiplexed address/data line drivers. It occurs when P1 is low, PBWR is asserted and the device has the Processor Bus (BUSM is high). |
| DALD | Produced by either the bus slave logic circuit or the bus controller circuit to load stable data into a temporary buffer. |
| INT | Asserted by a device to indicate what type of transfer is being made when the device is bus master. |
| INTEN | Asserted by the device to place the interrupt data word on the interrupt data bus (BD15 to BD00). |
| INTSTB | Generated by the bus slave logic circuit to cause the interrupt word to be latched in a temporary buffer. |
| PBEN | Asserted by a device to the bus acquisition/master logic circuit indicating that a transfer (data or interrupt) will be made |
| PBRQ | Asserted by the bus master indicating to a slave device that a transfer is being attempted. It is negated when the transfer is completed |
| TURN | A bit asserted by the bus acquisition/master logic circuit any time the device has gained access to the bus. It is negated any time the device gives up the bus and insures that all other devices may gain access to the bus. |
| WRT | Asserted by a device indicating whether a read or write transfer should be performed. |
| DAWRT | Asserted by a device to load a temporary latch with a data word to be written to another device. |

2.5 Processor Bus Protocol, Timing And Device Implementation

FIGS. 4 to 10 show in detail the BOSS Processor bus timing and the standard bus interface logic circuits that are common to all processor devices. This timing and the circuits assume that the buses are implemented with low-power Schottky TTL.

The following taken in conjunction with FIGS. 4 to 10 describes the Processor Bus protocol, configuration, timing cycles, device implementation, master device aquisition, logic and signals and the standard processor device interface circuits common to all processor devices. Tables 1 to 3 above describe Processor Bus signals and signals internal to the standard interface circuits. Table 4, below describes a sequence of nine Processor Bus cycles as a device begins its request to be bus master and finally receives requested data from a slave device. An asterisk (*) following a signal name is used to indicate negative logic or active low signals. Also, the signals identified with the suffix "0" (zero) are the least significant bit.

2.5.1 Configuration

A Processor Bus System such as Subsystem A in FIG. 1 is a collection of devices that plug into a common bus designated the Processor Bus 3. This bus has 36 signal wires described in Table 1 above that are common to and interconnect with every processor device. In addition there is one signal that is daisy chained from one device to another. Thus, the daisy chain output (PBENO*) from one device is passed to the daisy chain input (PBENI*) of the next device as shown in FIG. 2. The two daisy chain signals plus the 36 common signals make a total 38 Processor Bus signals listed in Table 1. The general function of each of the Processor Bus signals is described in Table 2 above.

2.5.2 Processor Bus Timing

The bus timing circuit 47 that drives the Processor Bus places a free running clock and synchronization signal (PBCLK* and PBSYNC*) onto the bus. These signals are used by all devices in their standard interface circuits (see FIGS. 5 to 10) to synchronize to each other. They do this by internally each generating the timing signals P1 to P6 shown as waveforms in FIG. 3. The rising edge of P1 is designated 1 (phase 1) and marks the beginning of one and end of another bus cycle. These signals are combined in various ways to generate all of the required Processor Bus and processor device internal signals described herein.

2.5.3 Bus Cycles

During any cycle of the Processor Bus, either bus acquisition or data transfer, or both may occur. To transfer data from one device to another it is necessary for the requesting device to acquire the bus (thus becoming the bus master). Only one device can be bus master during any one bus cycle. A specific characteristic of the Processor Bus is that a bus master must relinquish to another requesting device (whether at a higher of lower priority).

Figure 4:
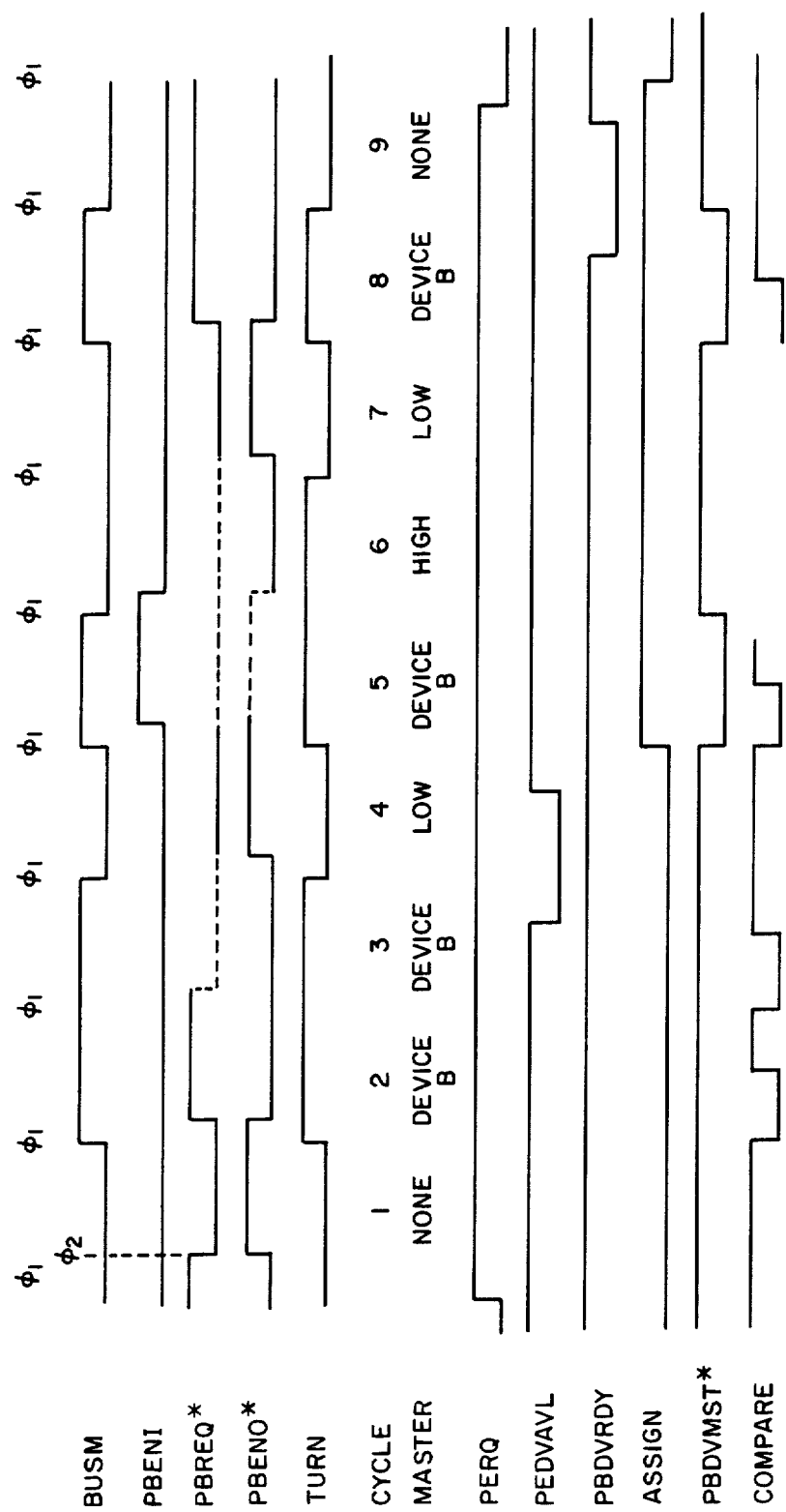
FIG. 4 shows timing signal waveforms involved in a typical timing sequence that demonstrates the principal Processor Bus cycles.

FIG. 4 shows a typical timing sequence that demonstrates the principal Processor Bus cycles. For example, let device B 17 in Subsystem A initiate an attempt to transfer data. Each cycle that might follow this initiation is described in detail in Table 4 below. It should be noted that many Processor Bus devices will operate on a single cycle basis, that is they will respond with PBDVRDY* the first time they are addressed as a slave. However, this is not always the case for an MCU controller, like 25, which may be requested to get information from a converter module, like A/D converter 31b on Converter Bus 5. It may take many cycles to accomplish that, because the converter module is a slow device.

2.5.3.1 Table 4

Bus Master Description—Cycles 1 through 9

Cycle 1—None: During cycle 1 no device is bus master. However, device B 17 (see FIG. 1) would like to acquire the bus. It does so by asserting the request line (PBREQ*) and by disabling all lower priority devices (raise PBENO*). Both of these signals were generated at phase 2 of the bus cycle.

Cycle 2—Device B: At the beginning of bus cycle 2, device B 17 sees that its enable input (PBENI*) is still asserted and since it had asserted PBREQ during the previous cycle, it now acquires the bus and becomes bus master. Since it has acquired the bus, it must relinquish the bus during the next cycle to any other device and it does so by negating PBREQ* and asserting PBENO*. In acquiring the bus, device B will generate the internal signal BUSM which is gated with other timing signals to implement the desired data transfer. At the end of the bus cycle, device B checks the PBDVAVL* to see if the device that it (as bus master) tried to communicate with is available. In this instance the addressed device did not assert PBDVAVL* indicating that either it was nonexistent or that it was busy completing some other task.

Cycle 3—Device B: At the beginning of bus cycle 3, device B sees that its enable input is still asserted and that no other device desires the bus (PBREQ* is not asserted). Thus, it may (and, in this example, does) become bus master again. This is the only time a device can acquire the bus without asserting PBREQ*. At the end of this cycle, device B sees that the addressed device (the slave) has asserted PBDVAVL* indicating that: (a) it exists; and (b) it is available for data transfer. The addressed device did not, however, assert PBDVRDY* thus indicating that the transfer was not completed. This normally will happen when the addressed device cannot respond within one bus cycle. For example, the addressed device may be the MCU Controller 25 which must get information from a converter module (a slow device). During bus cycle 3 some other device has asserted PBREQ* (shown as dashed line in FIG. 4).

Cycle 4—Lower Priority Device: At the beginning of bus cycle 4, device B 17 sees that PBREQ* has been asserted and therefore it must give up the bus. Since PBENI* is still asserted it is obvious that a lower priority device has requested and acquired the bus. Device B, since it has not completed the transfer, will assert PBREQ* and negate PBENO* to attempt to reacquire the bus.

Cycle 5—Device B: As in bus cycle 1, device B 17 sees that all conditions are proper to acquire the bus. To communicate with the same device it did in bus cycle 3, device B must now assert PBMST* to let the addressed device know that this is the same bus master for which it was available in bus cycle 3. The addressed device again indicated that now it is not ready by not asserting PBDVRDY*. Device B also set an internal signal TURN which is set any time the device acquires the bus. Because it is the bus master, device B will attempt to release PBREQ* (it stays low, because some other device is asserting it as indicated by the dashed line in FIG. 4) and to enable the bus at PBENO* (it stays high because PBENI* has gone high as indicated by the dashed line).

Cycle 6—Higher Priority Device: A higher priority device such as device A 15 has requested and acquired the bus. Device B 17 will not reset its internal TURN signal as it has not received by phase 1 an enable (PBENI*) signal. The higher priority device, however, will assert PBENO* (PBENI* at device B) and attempt to release PBREQ*.

Cycle 7—Lower Priority Device: A lower priority device such as device C 19 has received PBENI* and has previously asserted PBREQ* and therefore becomes bus master. Because device B has received at phase 1 PBENI* which it passed through to PBENO*, it may now reset TURN. Thus, at phase 2, it asserts PBREQ* and negated PBENO*.

Cycle 8—Device B: Having met the bus acquisition conditions, device B 17 reacquires the bus. It still must assert PBDVMST* to communicate with the same addressed device as in bus cycle 3. This time at the end of the cycle the addressed device (now a slave) asserts PVDVRDY* indicating that the transfer was completed.

Cycle 9—None (Idle): No devices have requested or are using the bus.

2.5.4 Processor Device Standard Interface

Figure 5:
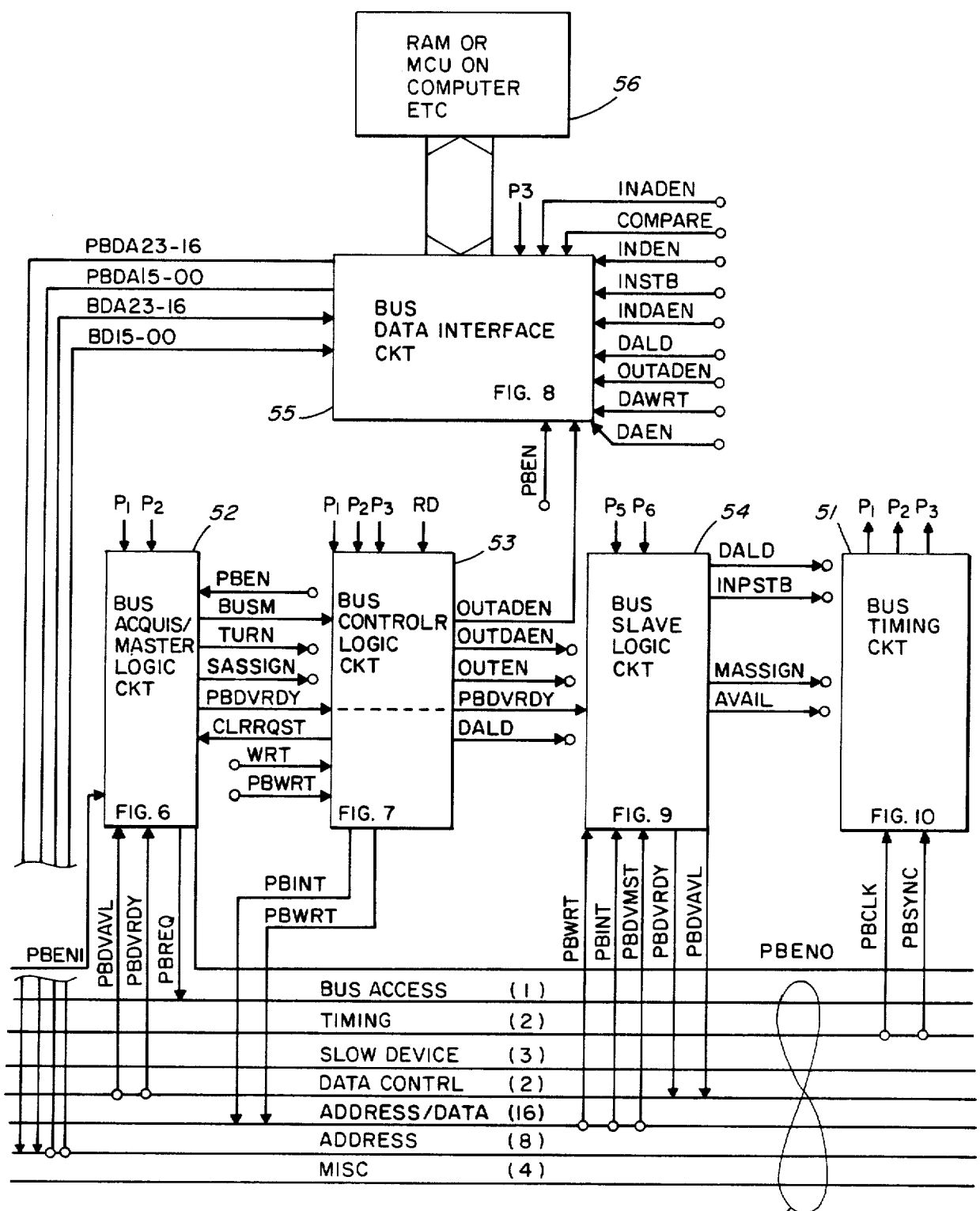
FIG. 5 is an electrical block diagram showing the five major sections in a Processor Bus device interface to the bus.

Implementation of the Processor Bus standard interface in a processor device such as device B 17, is divided into the five major sections 51 to 55 shown in FIG. 5:

(1) bus timing circuit (FIG. 10)
(2) bus acquisition/master logic circuit (FIG. 6)
(3) bus controller logic circuit (FIG. 7)
(4) bus data interface circuit (FIG. 8)
(5) bus slave logic circuit (FIG. 9)

All processor devices include these standard interface circuits. In addition, there is the device function circuit 56 which may be a RAM, an MPU, a CPU interface, etc., that carries out the function of the device in the Boss System.

2.5.4.1 Bus Acquisition/Bus Master Logic Circuit

FIG. 6 shows the schematic of the bus acquisition/master logic circuit 52 of FIG. 5. If the device wishes to communicate with another device (a decision made by its function circuit 56), it does so by providing a rising edge on signal PBEN in line 61. This will set port D of flip-flop 63, causing PBRQ in line 63 to go high. Programmable logic array 64 receives this request (PBRQ) at its IO port. It also receives the state of the four bus lines (PBENI*, PBREQ*, PBDVAVL* and PBDVRDY*) from lines 65 to 68 at its ports I3, I4, I1 and I2, respectfully, and (TURN and ASSIGN) in its internal lines 70 and 71, and it makes a decision on phase 1 as to the state of the six outputs and produces BUSM in line 69. Three of these outputs (PBENO*, PBREQ* and PBDVMST*) are used to drive the bus at phase 2. This is done by latch circuit 72 which produces those signals at its outputs Q1, Q3 and Q1, respectively. The Q2 output is ANDed with PBENI* in NAND circuit 73 to produce PBENO* and the other two are fed to line drivers (D) 74 and 75 that buffer them to the Processor Bus. Line receivers (R), 66a, 67a and 68a buffer PBREQ*, PBDVAVL and PBDVRDY, respectively, from the line to bus acquisition/master logic circuit 52. Signals BUSM and PBRDY are sent to the bus controller logic circuit 53, described further with respect to FIG. 7.

2.5.4.2 Bus Controller Logic Circuit

Turning again to FIG. 5, when the bus acquisition/master logic circuit 52 has acquired the bus, it sends the signal BUSM from 64 in line 69 (see FIG. 6) to the bus controller logic circuit 53 shown in detail in FIG. 7. In the bus controller logic, the controller logic circuit 53 also uses BUSM and the appropriate timing signal (P4) to control address and data flow during a bus cycle as shown in FIG. 7. BUSM andP4 are also fed to NAND gate 81 which produces OUTADEN* which is used to place address data on the bus during the first half of the bus cycle. NAND gate 82 responds to BUSM, WRT* and P1 and produces INDAEN* which is asserted to the controller logic circuit 53 and places data on the bus during a write cycle. NOR gate 83 responds to the outputs of 81 and 82 and produces OUTEN* which is asserted to the bus data interface circuit 55 and enables the bus drivers therein whenever valid data must be placed on the bus. During a read cycle the rising edge of DALD*, produces by NAND gate 84 and asserted to 55, latches incoming data. NAND gate 85 produces CLRRQST* whenever a transfer is completed and PBDVRDV* is asserted by the addressed device at the end of the cycle. CLRRQST* is asserted to the bus acquisition/master logic circuit 52 (see FIG. 6). AND gate 86 and line driver 87 cause the bus master to assert PBWRT* to the Processor Bus during BUSM and WRT*. AND gate 88 produces PBINT to line driver 89 which asserts it to the Processor Bus during BUSM and INT.

2.5.4.3 Bus Data Transfer Interface Circuit

The portion of a processor device interface that feeds data into and out of the device RAM, MCU, Computer, etc., such as 56 in FIG. 5, from or to another processor device or convertor module on the Converter Bus is the data interface circuit shown in FIG. 8. It feeds data and addresses to and from the Processor Bus where the device is in either the master or slave mode. In the slave mode, the data interface circuit receives its own address from the Processor Bus in line 91 at receiver 92 that feeds comparator 93 which compares the received address with the device address and produces at its A = B output the device internal signal COMPARE.

The rest of the incoming address which may be an internal address of the particular device and incoming data from the Bus, in line 105 is received at receiver 95 that feeds slave address latch 96, interrupt latch 97 and data latch 98. When the particular device is in the slave mode, some other device will be attempting to write either an interrupt word that has been received and stored in latch 97 or a date word that has been received and stored in latch 98, or it will attempt to read a stored data word from latch 101. The internal device may retrieve the received data from 97 or 98 at any time by asserting either INTEN* or INDAEN*, respectively.

If the device is in the master mode, then latches 98 and 101 operate. If, as master, the device has requested data from a slave, then the internal signal DALD is present and so latch 98 operates feeding the incoming internal address and data from line 105 to line 100. On the other hand, if as master the device is to send data to the slave device, then DAWRT is present and data latch 101 latches, feeding outgoing address and data to bus driver 102 which asserts it to the Processor Bus and the internal signal OUTDAEN* is produced by the bus controller logic circuit 53. In the master mode, if the device transmits a Processor Bus device address to a slave processor device, then PBEN is present and latch 103 operates feeding the address to line driver 104 which asserts that address as PBA23*- PBA16* when BUSM* is present. If the device transmits a Processor Bus device address, then OUTEN* is present and the address PBDA15* - PBDA00 is asserted by line driver 102 via line 105.

2.5.4.4 Bus Slave Logic

Figure 3:
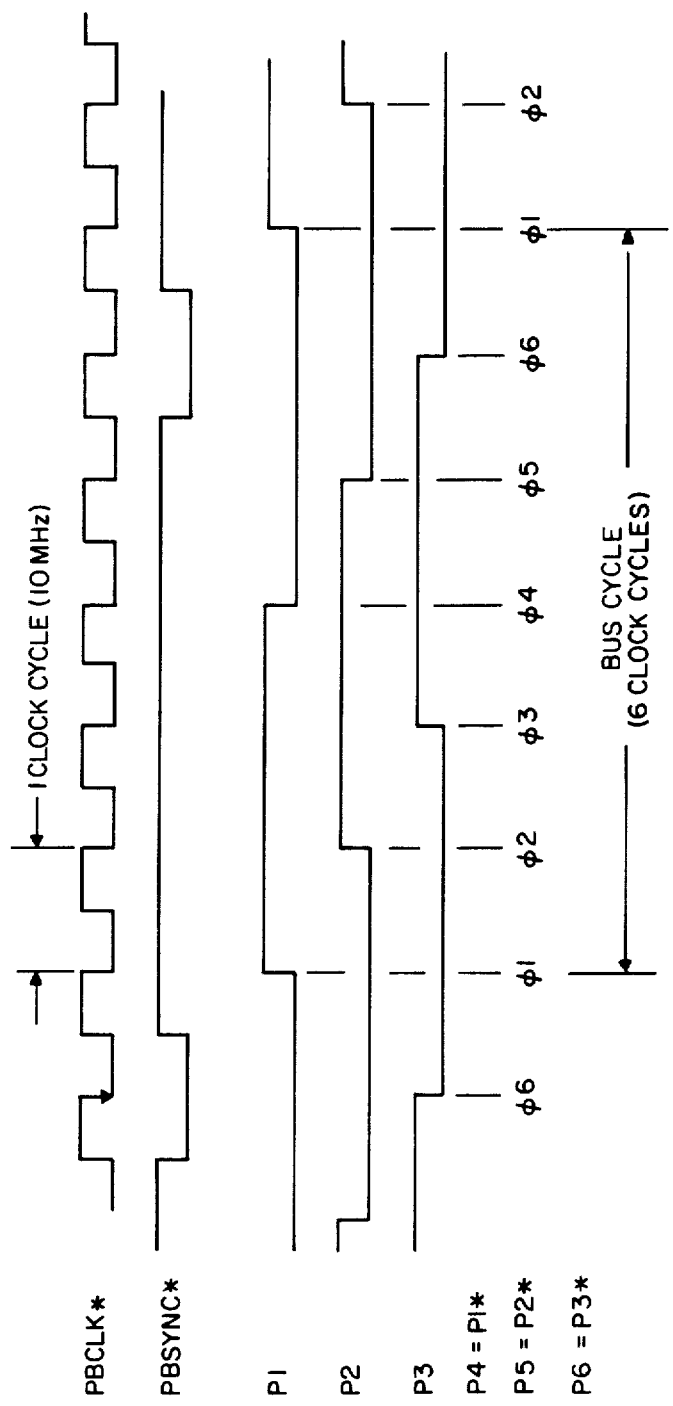
FIG. 3 shows the Processor Bus synchronization and timing waveforms as an aid to understanding Processor Bus operation.

The bus slave logic circuit shown in FIG. 9 produces the Processor Bus signals PBDVRDY and PBDVAVL in response to the Processor Bus signals PBDVMST*, PBINT and PBWRT from line receivers 107, 108 and 109, respectively, depending on the device internal signals COMPARE and DVREADY from the Bus and timing signals P4, P5 and P6 from timing circuit 51 (see FIG. 3). The interface programmable logic array (PLA) 110 responds to these bus and internal signals to produce PBDVRDY and PBDVAVL from line drivers 111 and 112, respectively, and internal signals INPSTB, DALD, SASSIGN and AVAIL. The input flip-flop 113 is set by P4 so that its Q output goes up when internal signal DVREADY is up (see FIGS. 3 and 4). PLA 110 produces the internal signals INPSTB, DALD, SASSIGN and AVAIL. Of these, INPSTB, DALD, SASSIGN and AVAIL are the Q outputs of flip flops 114 to 117 that are set by timing signals P6, P6, P5 and P4, respectively. An understanding of the timing accomplished by flip-flops 114 to 117 can be had from FIGS. 3 and 4.

2.5.4.5 Bus Timing

The bus timing circuit 51, shown in FIG. 10, includes shift register 101 which receives PBCLK* and PBSYNC* from line receivers 102 and 103 produces timing signals P1, P2 P3, P4, P5 that are fed to the other interface circuits 52 to 55 in the processor device to carry out their functions.

2.6 Slow Device Operation

As described above, all data transfers between processor devices is over the sixteen address/data lines of the Processor Bus. At any point in time, only one processor device can control the Processor Bus. At that time, that device is the bus driver, The bus driver, during a single bus cycle, can attempt to access another device to read or write to it. That addressed device is designated as the slave. These transfers are usually straight forward and are accomplished in one cycle with the possible exception of the operation of the three slow device control lines (see FIG. 2). Since the Processor Buses are freerunning at a fixed frequency, it is possible that with any given transfer, the slave may not be able to decode its address and perform its read or write operation within one cycle. This is particularly the case when the master addresses the MCU controller to one of the Converter Buses of the system to read or write to a converter module which is a slow device. It should be understood that reading or writing to a converter module is most likely to be slow and some processor devices may also be slow. In either case, the slow device protocol covered by the example in Table 4 above is designed to handle this situation without tieing up the Processor Bus while the slow device responds to its command. The bus control lines for PBDVRDY* and PBDVAVL* (see FIG. 9) and PBMST* (see FIG. 6) are used to control the data transfer. It is important to note that the control lines are used for I/O and memory cycles only. Interrupt transfers must be one-cycle transfers.

As evident from the example in Table 4 above, whenever a bus driver addresses a slave module and the slave is available (i.e. PBDVAVL* is set low by the bus slave logic circuit 55 (see FIG. 9 of the slave device standard interface circuits, indicating that the slave device is not busy performing some other operation), the bus driver becomes that slave's master. The master of any slave device is that device that will next be allowed to access the slave. The master may not at the moment be the bus driver, but it will be the bus driver when it accesses the slave. If the slave module lowers PBDVRDY* during the same cycle, the data transfer is complete and nothing else need be done. However, if the slave cannot respond within one cycle, then the PBDVRDY* control line in the bus will be left inactive, or high, during the cycle. When this happens, the bus driver device knows that it must go into a wait state and it should relinquish the bus for one cycle. The next time the bus is available, that same driver will repeat the bus command and this time it must lower the PBMST* control line indicating to the slave that it is the current master whom the slave is in the process of servicing. This is important because, the slave could be ready to transfer data and some other bus driver could be trying to access the slave device. The slave will indicate that it is ready only if the PBMST* control line is low. If the current bus driver is the slave master and if the slave is now ready with the data, the slave will lower PBDVRDY* indicating to the bus driver that the data transfer is now complete. During this cycle PBDVAVL* is still high indicating to the other devices on the Processor Bus that the slave device is tied up servicing its master. Once the slave device is ready, the bus driver will reset its master flag and terminate its wait state. All other bus drivers can try to access the slave while it is processing a previous command, but PBDVAVL* will remain high during their bus cycles. This indicates to other bus drivers that they are not the slave device's master and they must keep trying to access until it becomes available (i.e. PBDVAVL* low) and then one of them may become the new master.

2.7 Daisy Chain Operation

The successive processor devices, on the Processor Bus, as shown in FIG. 2, are all interconnected by the Processor Bus since they all interface in the same way to that bus. There is also a successive interconnection between successive processor devices on the basis of priority. This is referred to as the daisy-chain connection and is a form of hard programming for the processor devices, inasmuch as it connects them in a given predetermined sequence. As shown in FIG. 2, three successive processor devices A. B and C, denoted 15, 17 and 19, are successively coupled, the PBENO* output of each connecting to the PBENI* input of the next successive one. As explained in Table 3, hereinabove, PBENO* is a daisy-chain signal for which a low indicates to the next lower in priority device that it can have the bus during the next cycle; and, likewise, PBENI* indicates to the receiving device that the bus is available for its use on the next cycle. The signal PBREQ* is coupled by each device to the Processor Bus, a low indicating that a device or devices not using the bus during the current bus cycle require the bus for a data transfer. Hence, all devices on the Processor Bus receive the PBREQ* signal, whereas PBENO* and PBENI* are only between devices that are successive in priority.

2.8 Summary of Processor Bus Operating Rules

From the above, several design rules can be set down governing the Processor Bus drivers, masters and slaves.

1. The bus cycle period can vary from system to system and is typically selected to be the system memory access time, i.e. 300–600 nS in low-power Schottky TTL systems.
2. When multiple processors devices are used, unused connector pins can be utilized to distribute processor clocks in such a way that all processors are synchronous and that each processor's fetch and execute cycles are interweaved so that no two processor devicess try to access the bus at the same time.
3. The bus drivers (the processor devices standard interface circuits) are preferably designed not to request two consecutive bus cycles if any other processor device is requesting the bus. An exception might be a very high speed direct memory access (DMA) device that may have data burst rates equal to the bus cycle frequency.
4. If a device wants to perform both an input or an output data transfer and an interrupt transfer, the interrupt transfer should take precedence.
5. A slave device such as memory PC boards should be designed to be programmable with jumpers and to be 1, 2, or 3 cycle devices, since the bus cycle frequency can vary from Subsystem to Subsystem.
6. All device should try to minimize loading on bus signals, especially the bus timing signals.
7. All device should utilize the RESET* control line and have a defined initial condition (device available and all flags and interrupts reset).
8. The highest priority bus requesting device does not necessarily have to be the highest priority interrupting device, i.e. the PBENO* and PBENI* daisy chains (see FIG. 2) do not have to be wired similarly.
9. All interrupt transfers should be completed in one cycle.
10. All daisy chain signals should change on 2 only (see FIG. 3). The system design should insure that if all devices have valid internal bus and interrupt requests within 50 nS after 2, then the ripple through propagation of these signals must settle out at least 50 nS before 1 of the next cycle.

With the above in mind and FIG. 1 as a guide, refer again to FIGS. 1 to 10 for the following additional details of the signals and circuits shown in those figures. Turning first to FIG. 3, PBCLK* are the clock pulses at the clock rate 10 MHz and so the clock cycle is 100 nS. In this embodiment the Processor Bus cycle is six clock cycles and so the bus cycle is 600 nS. FIG. 3 also shows the timing signals P1 to P6 which are generated by the bus timing generator circuit 51 shown in detail in FIG. 10. The bus clock circuit 47 drives the Processor Bus 3 of Subsystem A and each subsystem may include such a clock driving its Processor Bus. As described above, each subsystem may run on a different timing set or all or several such subsystems in the total system may be subject to the same timing set and so they may all be driven by the same clock.

As shown in FIG. 3, the Processor Bus timing is from the bus clock (oscillator) at 10 MHz which is six times the bus cycle and so the bus cycle is 600 nS and the bus cycle frequency is 1.67 MHz, The output PBCLK* and PBSYNC* from the clock 47 are fed to the bus drivers, 47a and 47b, that drive the two timing lines of the bus (see FIG. 2). In the interface circuits of each processor device, the bus timing circuit 51 (see FIG. 10) includes a shift register 101 producing P1 to P6. All of these shift register outputs are fed to the other interface circuits 52 to 55 of the processor device to coordinate operation of the device.

3.0 BOSS Converter Bus

3.1 General

The Converter Bus is a medium speed 16-bit digital communication bus that is optimized for high fanout, minimum pin count and high noise immunity. It is used to implement directional data transfer between an MCU controller device on the Processor Bus (the Converter Bus master) and a slave converter module on the Converter Bus. Thus, the MCU controller is a Processor Bus device whose I/0 signals are the Converter Bus. Although there may be as many as 4,096 slaves (modules) on the Converter Bus, there can only be one MCU controller for that bus. The Converter Bus may be implemented with any of the standard logic families. FIG. 11 shows the general configuration of a single Converter Bus system for which there is only one bus master (the MCU Controller 25) and several slave modules (1---n---N), like #1 and #n in FIG. 11. Also, some modules like #n may include several conversion devices like #na and #nb in FIG. 11, each for a different I/0.

Each standard converter module has a standard converter module interface circuit to the Converter Bus that meets all of the requirements for interface to the Converter Bus. The converter interface circuit may include a custom CMOS gate array and CMOS integrated circuits for the remaining logic.

The Converter Bus clock signal (CBCLK) is, for example, 1.00 MHz and is synchronized with the Converter Bus cycle.

3.2 Bus Expander

The bus master cannot directly drive 4,096 converter module conversion devices for many reasons including bus loading and propogation delay of the converter module daisey-chain signals. Thus, a bus expander module like 110a (see FIG. 12) is used which provides a way of fanning out the bus by buffering all data and control signals. The expander is not an addressable device, however, it is transparent to all other module devices whether they are placed before or after the expander. Any module device will perform properly if there are up to two levels of expanders between it and the bus master. In FIG. 12, modules D through G (denoted 111) on the extended buses 5a and 5b are one level away from the master while modules H through J (denoted 113) on extended bus 5c are two levels away from the master. All modules (A through J) are on the same logical Converter Bus, denoted generally 5.

3.3 Address/Data Transmission

Figure 13:
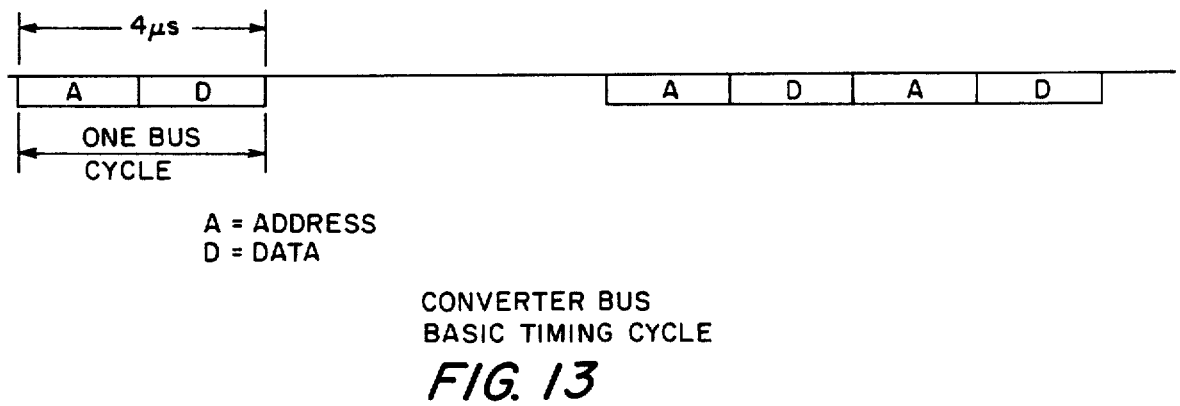
FIG. 13 is a waveform diagram showing a sequence of Converter Bus Address/Data basic timing cycles.

To minimize pin count for the Converter Bus, data and address information may be transferred on the same lines. This requires a two phase or time multiplexed address/data timing cycle such that the module address is placed on the bus line during the first phase and the data to be transferred is placed on the same line during the second phase. FIG. 13 shows this time multiplexed address/data cycle. During the first half of the cycle, the Converter Bus master 25 places a 16 bit word on the bus of which the lower 12 bits represent the address of the conversion device in the module (1---n---N), while the upper 4 bits define the type of transfer that will take place, like: data, command, status, identification, self test, etc.

3.4 Bus Lines

The Converter Bus has, for example, 26 signals carried on 30 lines as follows:
 16 data and address lines
 8 control signals on 10 lines
 1 reference clock on 2 lines
 1 reset signal on 2 lines

TABLE 5

Figure 14:
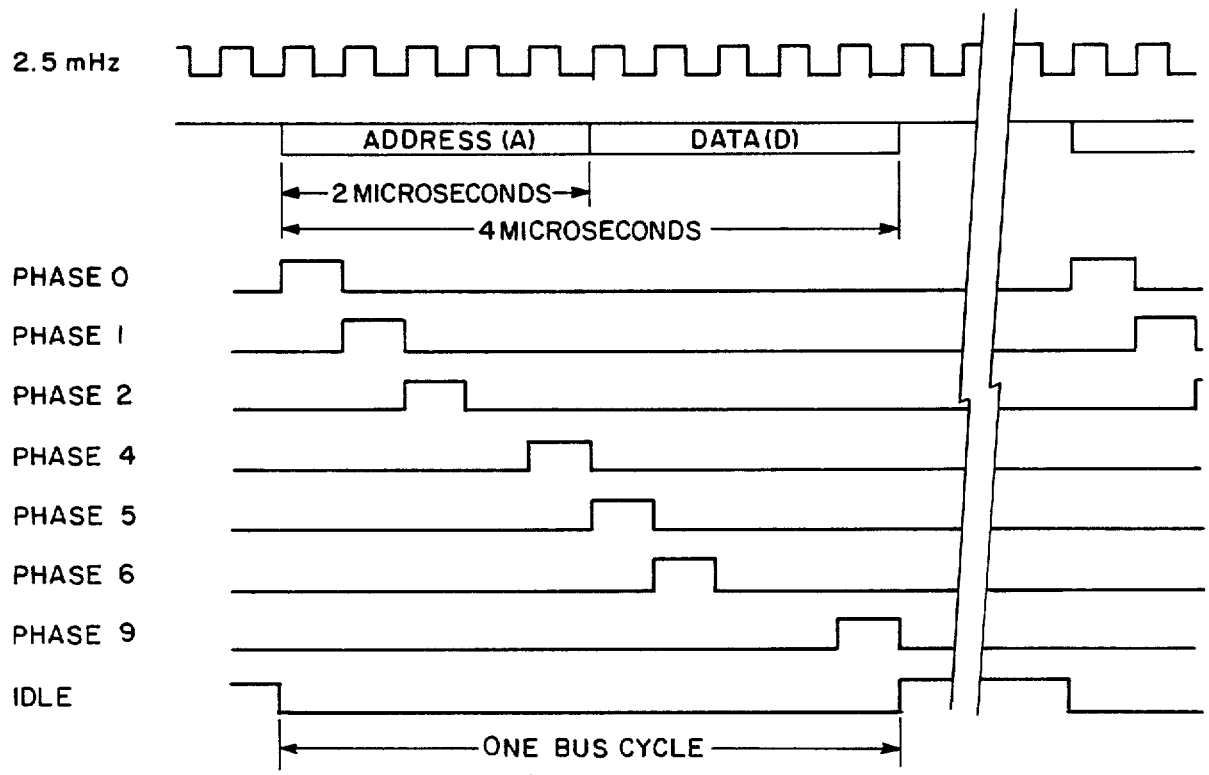
FIG. 14 is a waveform diagram showing the Converter Bus timing signals over one basic timing cycle as an aid to understanding converter Bus operations.
Figure 15:
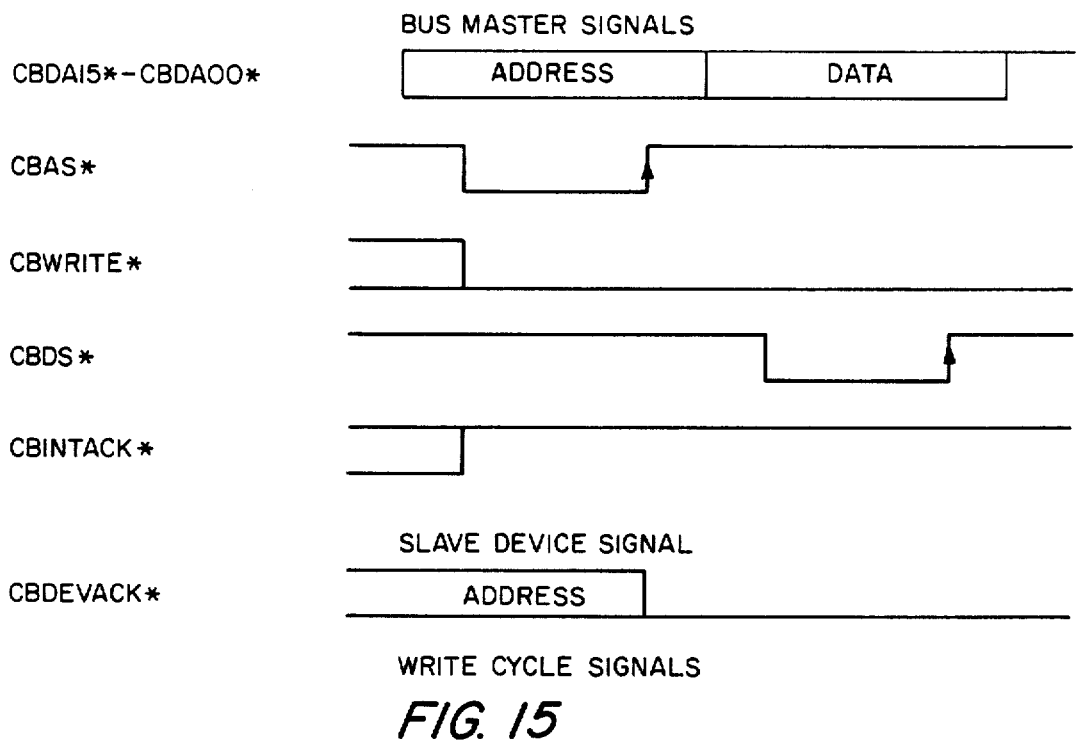
FIG. 15 is a waveform diagram showing the Converter Bus master and slave signals for a write cycle.

| Signal | Converter Bus Module Signals<br>Description |
|---|---|
| These signals are generated by the bus master (like 25): | |
| CBDA15* -<br>CBDA00* | Data/Address - 16 lines are provided - the most significant bit of a data word is CBDA15 and the least significant bit is CBDA00. |
| CBAS* | Bus Address strobe - begins at phase 1 and ends at phase 4 - see FIG. 14 and 15. |
| CBDS* | Bus Data strobe - begins at phase 6 and |

TABLE 5-continued
Converter Bus Module Signals

Figure 16:
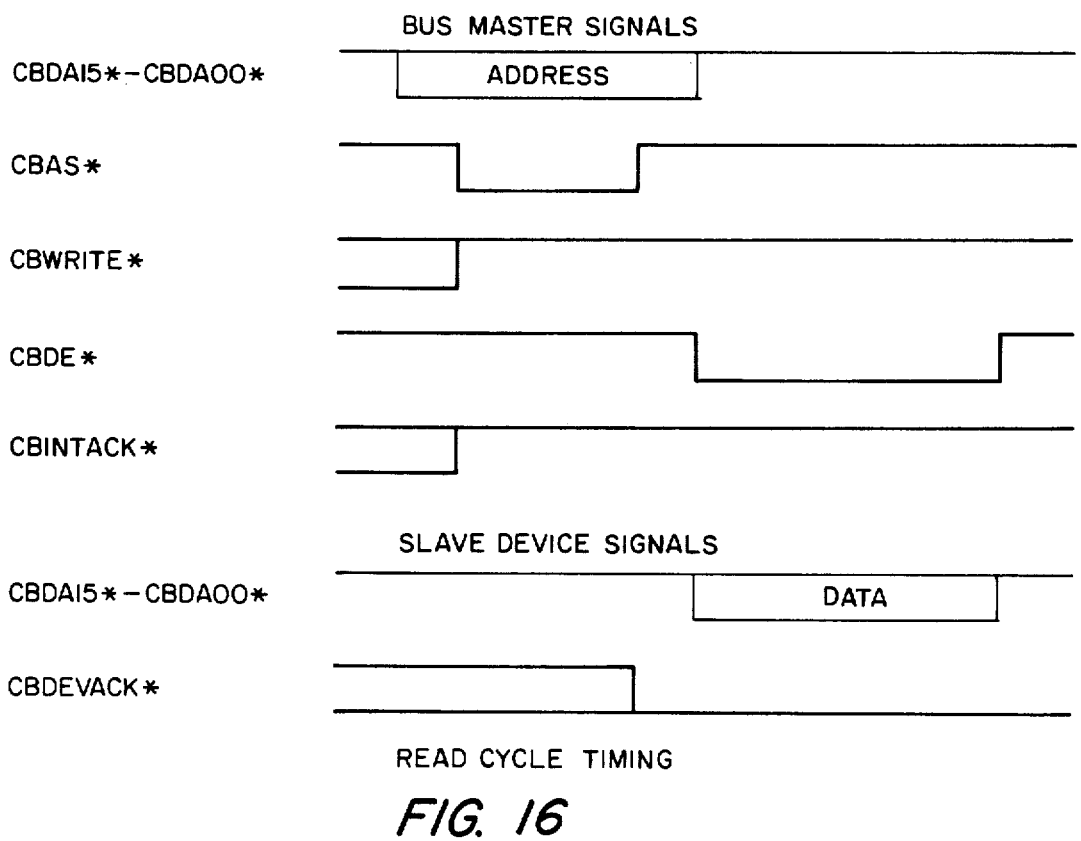
FIG. 16 is a waveform diagram showing the Converter Bus master and slave signals for a read cycle.

| Signal | Description |
|---|---|
| | ends at phase 9 - see FIGS. 14 and 15. |
| CBDE* | Data Enable - begins at phase 5 and ends at phase 0 of read cycle - remains high during entire write cycle - inserts data on bus. |
| CBWRITE* | Initiates insertion of address/data to bus - begins at phase 1 - see FIGS. 15 and 16. |
| CBINTACK* | Bus interrupt acknowledge - occurs after (400 ns) a bus cycle before the next cycle. |
| CBMR* | Master Reset is asserted at power turn on - initializes any devices with memory. |
| CBCLK* | Clock reference - 1.0 MHz |
| *These signals are generated by a slave converter device in a module:* | |
| CBDEVACK* | Conversion device acknowledges that it has received its address from bus master at phase 4-see FIGS. 15 and 16. |
| CBIRQ* | Interrupt request by a converter device (depending on it's daisey chain priority). |
| *These signals are generated by a conversion device after the bus master has initiated an EAT test cycle and the device is commanded to connect its source to the EAT bus:* | |
| PRIN | A daisey-chain signal-a low indicates to the next (in priority) converter device that the bus is available next cycle. |
| PROUT | A daisey-chain signal-a low indicates to the next (priority device that the bus is available and device has received a PRIN signal. |
| TESTDIS | Asserted by a device when TESTIN-TESTOUT are disconnected. |
| TEST1 TEST2 TEST2 | After TESTDIS, one of three lines is asserted by the device, depending on the magnitude of its source (I/O) voltage |
| TESTIN - TESTOUT | These are daisey-chained between conversion devices from module to module and is disconnected when master commands to connect source to EAT Bus. |

3.6 Bus Timing

FIGS. 14 through 18 show the Converter Bus timing for each of the different transfer cycles (except EAT Bus timing) as they appear on the Converter Bus. It should be noted that the custom gate array 130 of the standard converter module interface circuits, described particularly in section 3.11 hereof with respect to FIG. 22 and shown also in FIG. 20, supports all of these modes.

FIG. 14 shows typical Converter Bus timing cycle wave forms. Note that the Bus cycle is of a fixed duration (4 microseconds), that it is divided into 10 phases, and that an indefinite number of "idle" cycles may occur between Bus cycles (there also may be no "idle" cycles). A 1.000 MHz clock, derived from the clock that generates all of the phases, is available on the Bus (CBCLK). All control signals are generated by the bus master 25 and these signals are sufficient for any module to properly implement a data transfer.

3.7 Write Cycle

The write cycle provides a means for transmitting one word from the Bus Master to a selected converter device in a converter module. FIG. 15 shows the write cycle timing. The Bus Master nitiates a bus write cycle by placing the device address (Bits CBDA11*-CBDA00*) and the transfer type (Bits CBDA15*-CBDA12*) on the bus at the phase 0 (rising) edge. At phase 1 it will set the CBWRITE* line high (if not already high) and assert the address strobe (CBAS*) and at phase 4 raise CBAS*. At this rising edge, each device on the Converter Bus must decide whether the address on the Bus is its address (or not) and set a flip-flop if it is. This flip-flop may be physically in the gate array. The address/type information remains on the Bus until phase 5, at which time the bus master (MCU controller) removes the address/type information and places the data word to be transmitted on the bus. At phase 6 the data strobe (CBDS*) is asserted and then raised at phase 9. This rising edge is used by the receiving device to latch the stable data on the Bus. It should be noted that the CBWRITE* line will only change state at phase 1 even though there may be many idle phases in between. Note also that data enable (CBDE*) is not used as it remains high during the entire write cycle.

3.8 Read Cycle

The read cycle provides a means for transferring one word from a selected device to the bus master. FIG. 16 shows the read cycle timing. The device is addressed in the write cycle except that the read/write line (CBWRITE*) is asserted at phase 1. When the address/type data is removed at phase 5 the data enable (CBDE*) signal is asserted. The addressed device uses CBDE* to gate valid data onto the bus. The bus master will then sample that data at the rising edge of data enable (phase 9 falling edge).

3.9 Interrupt Cycle

An interrupt cycle allows any slave to inform the master that the slave needs to be serviced. It does so by asserting interrupt request (CBIRQ*) to the Converter Bus. CBIRQ* may only be asserted by a device if (1) CBIRQ* is not being asserted by some other device; or (2) CBINTACK* is not asserted (i.e. an interrupt is not being serviced.

There is here a potential race: two devices may simultaneously lower CBIRQ*, both noticing that the line was high an instant earlier. A converter module daisy-chain priority system is employed to "resolve" the race condition. The module that is logically farthest away from the bus master always has its PRIN line high (tied to 12VDC) and always has highest priority. A device will lower its priority output (PROUT) line (thus disabling all devices closer than it to the Bus Master) under two conditions: (1) Any time that device asserts CBIRQ*; or (2) If its PRIN (PROUT of the previous module) line is lowered.

Figure 17:
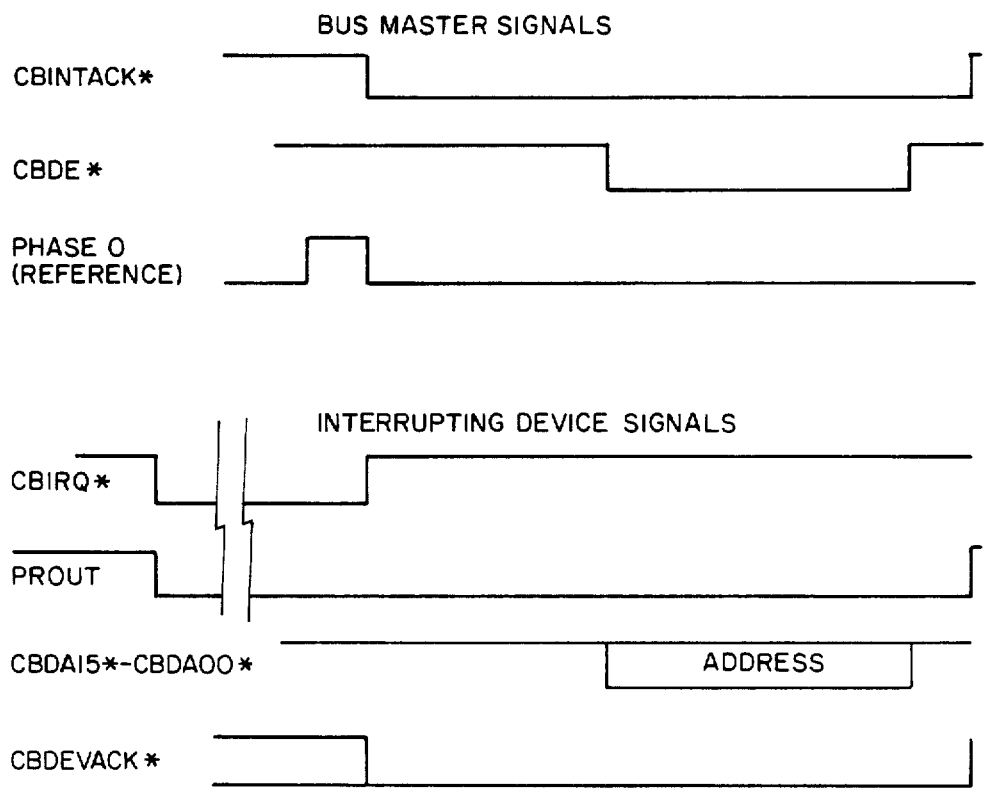
FIG. 17 is a waveform diagram showing the Converter Bus master and slave signals for an interrupt cycle.

The Bus Master, upon receiving the asserted CBIRQ* signal must wait 20 microseconds to ensure that the entire PRIN - PROUT daisy-chain has settled out. After that "wait", the Bus Master initiates an interrupt acknowledge cycle as shown in FIG. 17. At phase 1 the Bus Master will assert CBINTACK*. The device whose PRIN line is low and has asserted CBIRQ* will assert CBDEVACK* and release CBIRQ*.

At phase 5 the bus master asserts CBDE* which causes the interrupting device to place its address and type code on the bus. The bus master samples the address/type data on the rising edge of CBDE* (phase 9 falling edge). At a future time the Bus Master will, using an interrupt service routine, service that interrupting device. The Bus Master raises the CBINTACK* line one clock cycle (400 ns) after phase 9 falling edge. When CBINTACK* goes high; the interupting device allows PROUT to be re-asserted. Note that the read/write line (CBWRITE*) does not change during the interrupt acknowledge cycle nor are CBAS* or CBDS* used (they remain high during the entire cycle).

Those modules that do not use interrupts should provide a direct through connection from PRIN to PROUT so that the interrupt daisy-chain is not broken if a non-interrupting device is removed. Continuity of the daisy-chain should be maintained.

3.10 Block Read/Write

Figure 18:
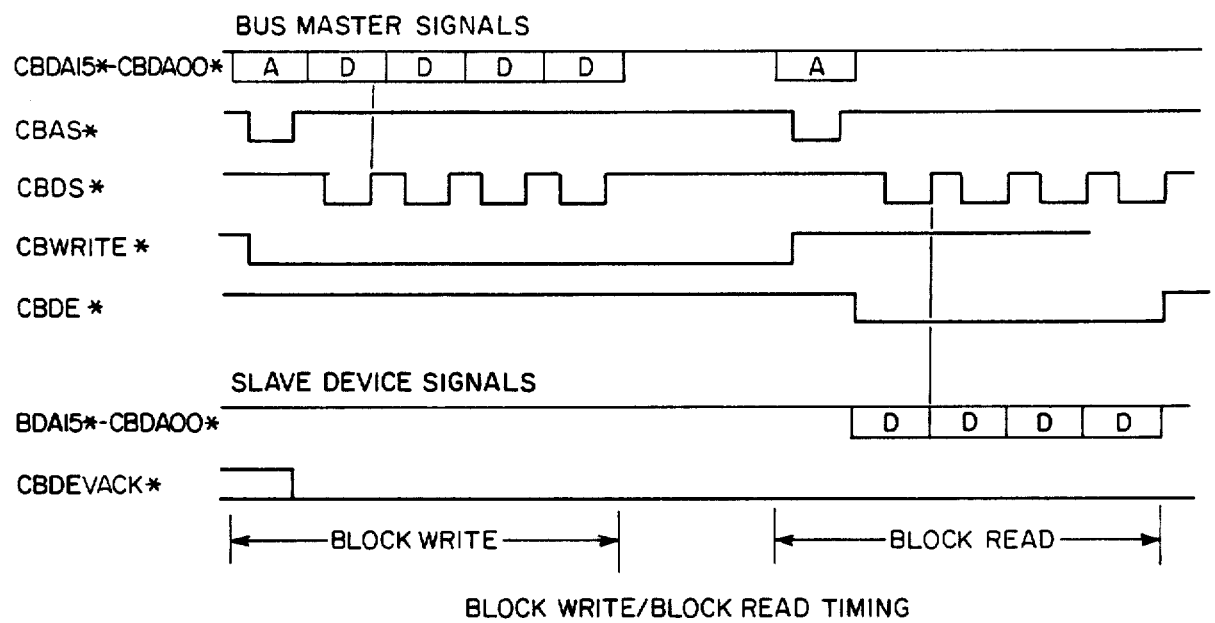
FIG. 18 is a waveform diagram showing the Converter Bus master and slave signals for block write/read timing.

The Converter Bus supports a block write and block read mode as shown in FIG. 18. This allows a bus master to read or write a block of data to one conversion device. It does this by selecting the device with an address half of the cycle (described above under write cycle, section 3.7) and then by repeating, as many times as is required, the data half of the cycle. The bus master may insert gaps between successive data cycles and may even insert an interrupt acknowledge cycle (of another device) in between data cycles as each device has remembered that it was the last device addressed.

Note that the data strobe (CBDS*) is not located during the same time phases during a read and a write cycle. This allows the rising edge of CBDS* to be used as a clock to a counter or shift register so that successive words can be read or written. CBAS*, since it is generated only once per block transfer, can be used to initialize the block transfer (clear the counter, etc.).

3.11 Converter Module Interface To Bus

By providing a standard Converter Bus interface circuit in each converter module, an inventory of standard converter module cards will allow new system configurations to be created by selecting from the cards. By this technique, fewer variations of card types are required and scale factors, polarities and code conversions can be performed by software. Also, testing and test equipment is simplified with this Converter Bus design. By establishing fixed addressing, data format, command format and status formats for all cards, software modules may be standardized.

The BOSS Converter Bus configuration in the embodiment uses twelve address bits which can service a total of 4,096 unique converter modules. The remaining four bits (sub-addresses) are intended to access functions within a specific module.

3.11.1 Implementation

Figure 20:
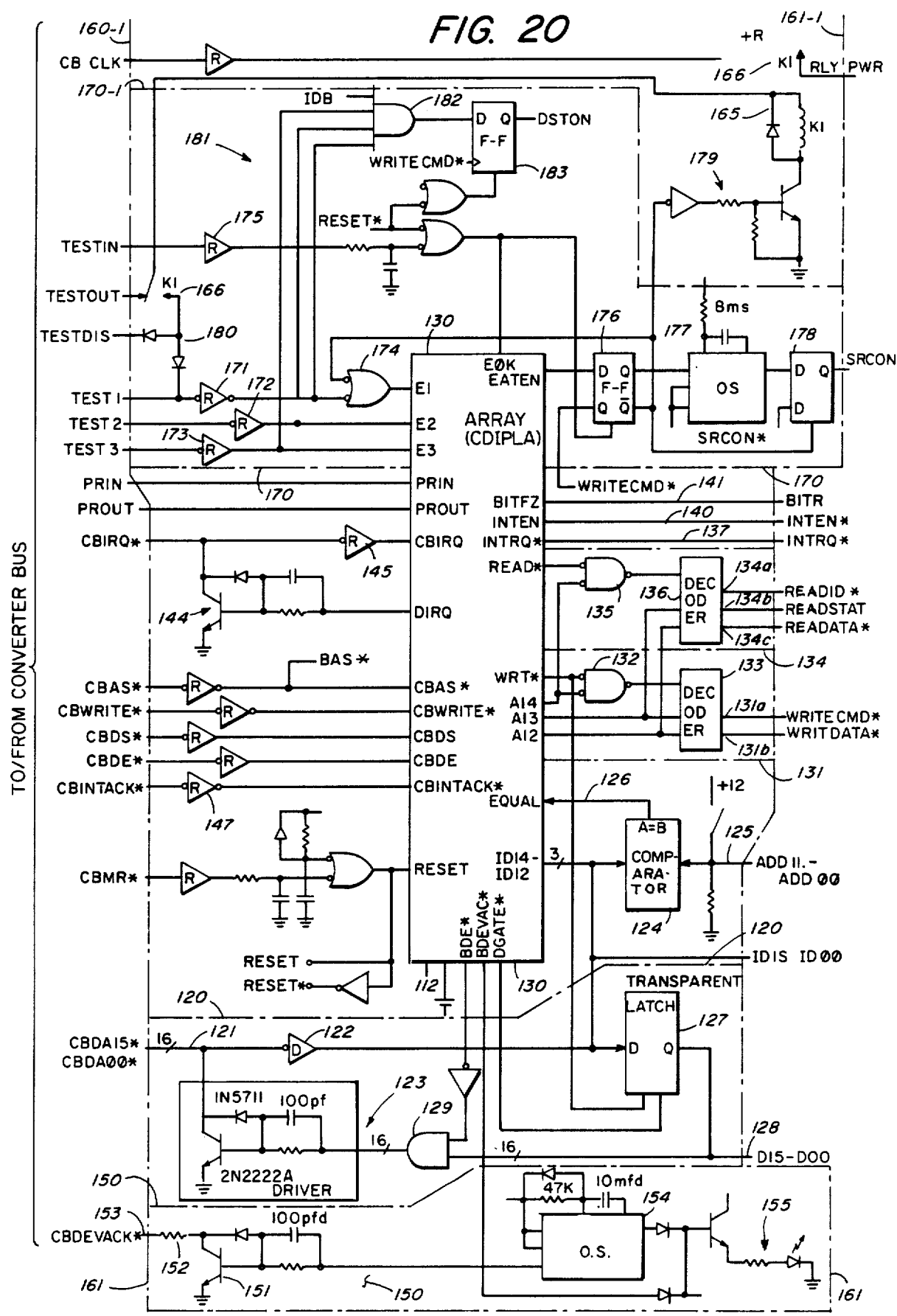
FIG. 20 is an electrical circuit and block diagram of the standard converter module interface shown in FIG. 19.

The schematic in FIG. 19 shows the standard converter module interface circuit. Note that the signals on the left side of FIG. 19 to or from the Converter Bus, while those on the right are used by the converter device in the module. This implementation shows a converter module that has only one converter device. Details of the standard converter module interface employing a semi-custom CMOS gate array are shown in FIG. 20. Further details of the interupt request part of the standard interface are shown in FIG. 21. The following subsections of this section 3.11 give details of the standard interface structure, multiple device options, interrupts, and other configurations.

3.11.2 Data Flow

FIG. 19 shows the standard interface curcuit such as 160-1 in FIG. 11 that connects a single conversion device such as 161-1 to the Converter Bus. The signals from the Converter Bus are listed on the left side of the interface 160-1 in FIG. 19 and all are from or to the bus master 25. The signals listed on the right side of the interface in FIG. 19 are used within module #1 between the standard interface 160-1 and the conversion devive 161-1. Those signals and their use are explained with reference to FIGS. 20 and 21. Some of the circuit parts between the interface 160-1 and the conversion device 161-1 (called converter module internal circuits) are shown in FIGS. 19 and 20 or in FIGS. 19 and 21 and are described with reference to the latter Figures.

In FIG. 20, data flow circuits 120 controls data flow through the standard interface circuit. The 16 data/address lines (CBDA15*-CBDA00) 121 are buffered in both directions by drivers 122 and 123. The lower 12 bits of the received data is fed to a comparator 124 where it is compared against a fixed (DIP switch) device address in lines 125 from the conversion device 161-1. The equal (A=B) output of the comparator in line 126 will be sampled on the rising edge of the address strobe (CBAS*). The upper 4 bits of the received data is also saved (in array 130) on the rising edge of CBAS* so that the transfer type may be retained. In addition all 16 bits of the received data are fed to a transparent latch 127 where they are saved during write (output) operations. The transparent latch 127 output is connected to the module's internal data bus (D15-D00) by line 128. Input data on the bidirectional internal bus is fed back through AND gate 129 controlled by BDE* from the converter module interface programmable logic array 130 to the Converter Bus, via driver 123. Array 130 is a semi-custom CMOS gate array. A logic circuit diagram representing array 130 is shown in FIG. 22 and described herein under the next subsection 3.11.4.

The internal data bus 128 is not used for any other functions. The only time a converter device places data on the bus is when READEN* or INTEN* is asserted. At other times the interface circuit may be using the bus.

3.11.3 Interface Gate Array

The interface array 130 in FIG. 20 can be represented by the logic circuit diagram in FIG. 22. The input/output pins are identified by signal names along the left 142 and right 143 sides of the diagram. They correspond to the inputs and outputs of the array 130 in FIG. 20. The logic gates 144 in FIG. 22 are represented by symbols that are standards published by the Institute of Electrical and Electronic Engineers (IEEE). All of the gates in FIG. 27 are AND, NAND or OR gates and some are inverted. Inverters are also represented by standard symbols.

The array also includes a "D-type" latch 145 which is fed DA14, DA13, DA12 and EQUAL at its D ports and produces A14, A13 and A12 at its Q parts at the bus address strobe CBAS. The performance of array 130 can be followed from the well known functions represented by the standard symbols for gates and inverters.

3.11.4 Address Cycle

During the first half of the Converter Bus cycle, the bus master is addressing a selected device. If there are multiple conversion devices in one converter module (like module #n in FIG. 11) the interface must use the buffered address strobe (BAS*) to latch those lower bits of the 12-bit address ID11-ID00 in line 120 that select the conversion device within the module. Valid address data can be latched with a "D-type" latch on the rising edge of BAS*. In addition, the address comparator 124 needs only to receive those bits that address the module (i.e. it will recognize all devices on the module).

It should be noted that three of the four transfer type bits (14, 13, 12) are latched by the gate array 130 and brought out to the interface as outputs A14, A13, and A12 of the array 3.11.5 Data Write Cycle During a data write cycle, the WRITEN* strobe rising edge, initiated by WRT and A14 from array 130, is used to latch the valid data on the internal bus. This internal data interface is denoted 131 and initiates internal bus signals WRITECMD* and WRITDATA* at the WRITEN* signal strobe. As with the address data, the data is latched with a "D-type" latch 145 in the array as it is not valid at all times. As shown, the data interface 131 includes NAND gate 132 fed WRT* and A14 and producing WRITEN* which is fed along with A13 and A12 to decoder 133.

Any single converter device may have several words written to it such as: device data, device command or data rebound. These separate words are selected by the transfer type specified by bits 15 through 12 of the device address/type word. WRITECMD* and WRITDATA* from decoder 133 may each be further decoded by 1 of N decoders (not shown) that generate separate signals for the different transfer types used. In addition, as mentioned above, any module may have several converter devices and further decoding may be performed to generate separate signals for the different devices. Sufficient setup time is provided to allow the signals to propagate through two levels of such 1 of N decoders. The buffered and latched address lines are also stable during the entire time that WRITEN* is low so that direct address decoding may be employed.

3.11.6 Data Read Cycle

During a data read cycle the READEN* signal, initiated by READ* from array 130, controls data onto the module internal bus. The interface for this is denoted 134 and initiates internal bus signals READATA*, READSTAT*, and READID* when the READEN* signal from NAND gate 135 which is fed READ* and A14 from array 130. The decoder 136 is fed READEN*, A13 and A12 and produces said internal bus signals READATA* and READSTAT* which may each be further decoded by 1 of N decoders (not shown) that generate separate signals for the different transfer types used.

Any single conversion device may input several different words such as: device data, device status, data rebound or device type. As with the data write cycle, the transfer type is specified by bits 15 through 12 of the address/type word. A 1 of N decoder is required to generate separate READIN* signals for each transfer type. In addition, further decoding may occur if there are several I/O conversion devices in one module.

3.11.7 Interrupt Request

The interrupt cycle described above in section 3.9 provides that any conversion device can inform the master that it needs to be serviced by asserting CBIRQ, provided that CBIRQ is not being asserted by another conversion device and CBINTACK is not being asserted by the master. As shown in FIGS. 20 and 21, interrupt request is initiated by INTRQST* in line 139 which sets flip-flop 138 Q output producing INTRQ in line 137 to array 130. This is initiated by a rising edge on the internal INTRQST* line 139 (see FIG. 21). The array produces DIRQ to circuit 144 which asserts CBIRQ to the master via the Converter Bus, unless CBIRQ is already being asserted and is received by receiver 145. If the INTRQ* line 137 is asserted, the interrupt request will be confirmed. When the bus master 25 acknowledges the interrupt by sending CBINTACK that is received by receiver 145 into array 130, the array produces the signal INTEN* in line 140 which causes the removal of the request by the action of NOR gate 146 and flip-flop 147 (INTRQ* should go high) and places the conversion device address on bits D11 through D00 from line 125 of the internal data bus 128. This is accomplished by decoders 148 and 149. In bits D15 through D12 the conversion device may place an interrupt code that informs the bus master of the type of interrupt that is generated.

3.11.8 Conversion Device Acknowledge

The bus signal CBDEVACK*, like CBIRQ*, is generated from within a conversion device. It signals to the bus master that the device has received its address from the master. It is generated by the acknowledgement corcuit 150 shown in FIG. 20 in response to the internal signal BDEVACK from array 130 (see FIG. 22). In circuit 150, transistor 151 draws current to ground through bus line 153 and resistor 152. If another conversion device responds to the same address, it will draw current from line 153 also. At the same time, BDEVACK from array 130 triggers one shot multivibrator 154 that turns on light emitting diode 155 in the module to indicate to an observer that the module has responded to its address.

Figure 25:
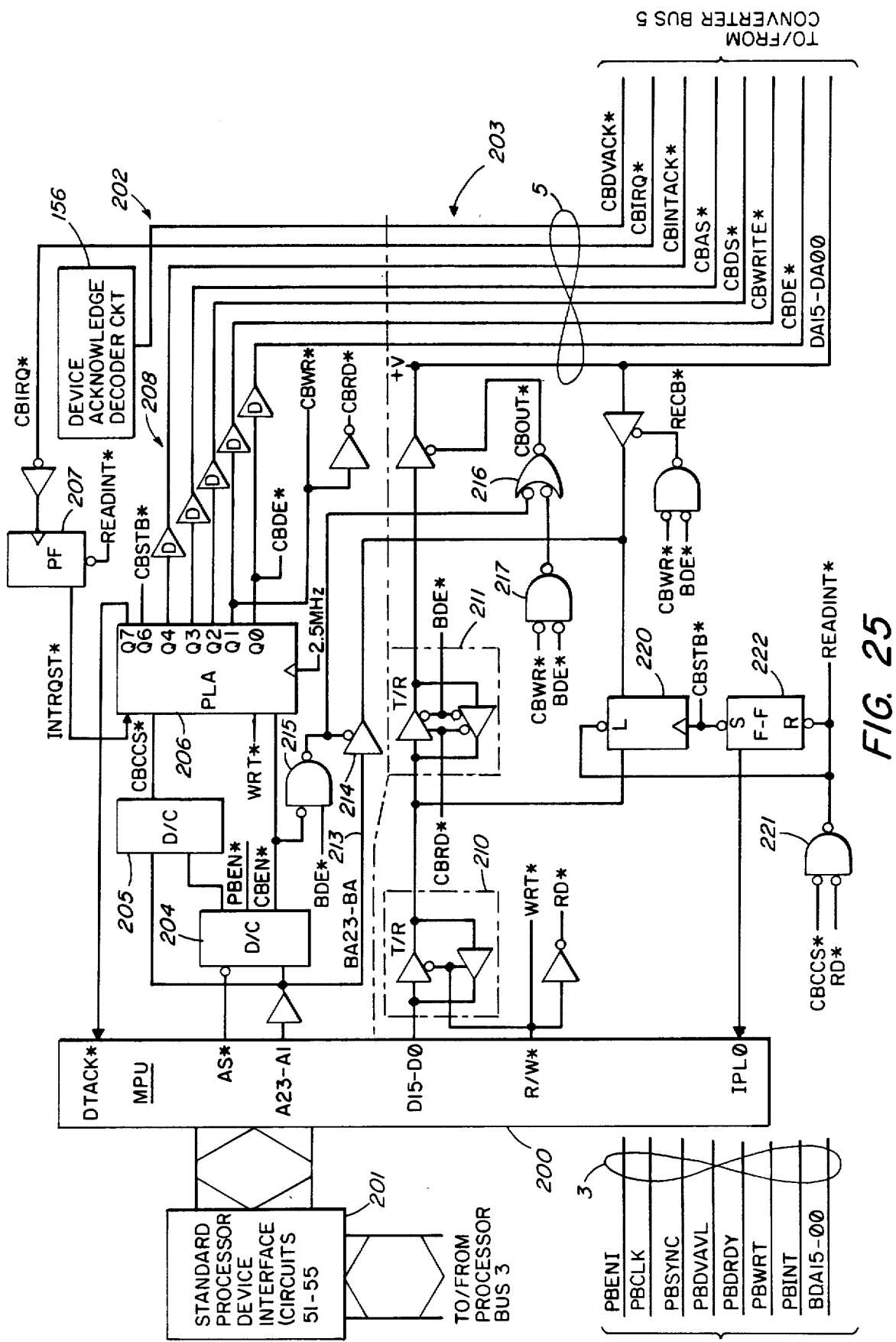
FIG. 25 is an electrical block and logic gate diagram of an MCU controller of a Converter Bus showing signal connections to the Processor Bus, Converter Bus and Interprocessor Bus.

At the MPU controller shown in FIG. 25, the current drawn by the line 153 is measured by the conversion device acknowledgement decode circuit 156 which determines the number of conversion devices that have responded to the address. Details of circuit 156 are shown in FIG. 26.

As shown in FIG. 26, the acknowledgement decode circuit may include a fixed ratio voltage divider 157 providing constant inputs to each of two differential amplifiers A and B, denoted 158 and 159. The second input to each amplifier is the voltage drop across resistor 160 in line 153, which will depend on the number of devices drawing current from line 153 (the number sending the CBDVACK signal). In no device sends CBDVACK the line 153 current draw will be essentially zero, the second input to both amplifiers A and B will exceed the first and the amplifiers will both produce a "one" output to NAND gate 161 which will produce a "zero" output. Hence, no CBDVACK signal is indicated by the decoder output "one, zero" (1,0). If one device only sends CBDVACK, the current draw will be sufficiently large so that the second input to A will exceed the first input, but not so for B and the decoder output will be 0,1. If two or more devices send CBDVACK signals then the first input to both amplifiers will exceed the second and the decoder output will be 0,0. By this technique, an indication can be had that one and only one device has acknowledged an address

3.12 Summary of Converter Bus Operating Rules

To simplify the Converter Bus system, bus transfers are not allowed between converter modules, only between the Converter Bus master (MCU controller), like 25, and the converter modules like 31-1 etc. Also the bus master may not relinquish control to any other device. The resulting Converter Bus has, as can be seen from Table 5 of section 3.5 hereof, eight signals that control the information transfer on sixteen data lines. In addition there are two signals, CBCLK and CBMR that provide each converter module with a reference clock frequency and a reset function that will simultaneously initialize all of the converter modules on the bus. The address signals CBDA15–CBDA00 are generated by the bus master that is used by each slave converter module to store address and data words. Data enable CBWRITE* is a signal that is asserted by the bus master during the data phase and a slave responds to it by putting data onto the bus or receiving data from the bus.

The Converter Bus master (like 25 in Subsystem A) can address any conversion device module on its Converter Bus 5 or extensions 5a, 5b, 5c, etc. thereof (see FIG. 12), that it is coupled to and it can request that the conversion device to send or receive data. Single data word transfer occurs during the data portion of the Converter Bus timing cycle (see FIG. 13). If the conversion device in a module is busy and is, therefore, only ready at random or over long term intervals, it will generate an internal interrupt request signal and if no other device is requesting an interrupt, will send CBIRQ*, signifying to the master that a valid transfer can take place. When the master acknowledges the interrupt by a CBINTACK* signal, the interrupting module will transfer its address to the master when the master initiates the data transfer by the CBWRITE* signal (see FIGS. 15 and 16).

To request an interrupt, the signal interrupt request CBIRQ is asserted by any of the conversion devices. Each device must be designed so that it cannot request an interrupt during the time when another converter device's interrupt is being acknowledged. This ensures that there is no ambiguity as to which device is requesting service. The interrupt request daisy-chain ensures by signals PRIN and PROUT that only one device at a time is given priority. That device responds to the interrupt acknowledge signal CBINTACK (see FIG. 16) by placing its address on the bus during the interrupt cycle.

4.0 BOSS EAT Bus

4.1 General

The BOSS EAT Buses, such as 9 in FIG. 1, are used to connect analog signals together. The EAT Bus is a set of 34 lines that are connected (bused) to conversion devices that convert complementary types of signals. For example, as shown in FIG. 11, converter module 31-1 (called module #1 of the series (1---n---N) on Converter Bus 5) includes interface circuit 160-1, conversion device 161-1, relay switch and driver 162-1 and I/O line 163-1. Converter module #n includes the standard interface circuit 160n for two conversion devices 161-na and 161-nb, each with a relay switch and driver (162-na and 162-nb) to its I/O line (163-na and 163-nb) and to the EAT Bus.

The EAT Bus is a separate bus with a totally different function from the Convertor Bus. The major relationship between these two busses is: (1) Actions on the EAT Bus are initiated and controlled by commands on the Converter Bus and (2) Normally, devices on the Converter Bus will also be using the EAT Bus so that both buses can be on the same backplain.

A conversion devices is switched to the EAT Bus by a relay switch like 162-1 on module #1 of FIG. 11. The relay switch is a +12 v relay coil power control switche with interlock that insures that only one analog output driver is connected to the EAT Bus at a time. The interlock is required, because, in general, analog drivers may not have their outputs tied together without incurring serious damage to the analog curcuits. Effectively this presents a short circuit to each analog output. FIG. 24 shows a typical relay switch interface between a conversion device and the EAT Bus. This relay interface includes two driven switches K1 and K2 as shown in FIG. 24. An output conversion device like na contains an analog driver while an input conversion device like nb contains an analog receiver.

The switches K1 and K2 of a relay interface couple the conversion device driver or receiver to the EAT Bus and/or to the device I/O line, and/or to the input of a complimentary conversion device, and/or to other monitors according to the operations set forth in Tables 6 and 7 below (paragraphs 4.3.1 and 4.3.2).

4.2 Timing

FIG. 23 shows the EAT Bus timing protocol. The bus master initiates an EAT cycle by writing to, for example, an input conversion device in a module, a command to connect its source (I/O line) to the EAT Bus. The device will then initiate several events through its module standard interface to the Converter Bus:

(1) It removes power from TESTOUT (disconnects the path from TESTIN to TESTOUT).
(2) It asserts TESTDIS.
(3) It asserts one of the three test lines (Test 1, 2 or 3) depending on the magnitude of the source signal voltage.
(4) It initiates a time delay before it allows data to be placed on the EAT Bus.

The bus master waits a minimum of 10 ms after the source connect command before issuing destination connect commands. The bus master may connect as many destinations to the EAT Bus as is consistent with source loading. A destination device may connect to the EAT Bus if it has received a Converter Bus command to do so and one (and only one) of the three TEST lines is high and it agrees with the data level of that device.

As shown in FIG. 23, after all destination devices are connected to the bus, the "test connect" phase is completed and the "test data" phase may start. During the "data" phase, a data word is written to the source device. After sufficient delay to allow settling of the source data and conversion of the destination data, the bus master reads a word from all of the destination devices. The Bus Master may repeat this "write to the source, delay, read from the destination(s)" cycle as many times as is desired to complete the "test data" phase of the EAT timing cycle. After the "test data" phase, the bus master issues "test disconnect" commands to the destination device(s), and then to the source device.

4.3 Operation

The EAT Bus may receive signals from an output device, like na in module #n (see FIG. 11), or from an input device like nb and connect the driver or receiver of the device to a number of other conversion devices and/or the I/O lines of other devices and/or other monitors. The structure of a relay switch and driver is shown in FIG. 24. It shows the connection of an output device like 161-1 and its I/O line 163-1 to the EAT Bus. The relay driver 165-1 in FIG. 24 drives two SPDT relays K1 and K2, denoted 166-1 and 167-1, that are required for each I/O signal (including returns). Table 6 below shows the function of the EAT Bus for an output device depending on which of the relays K1 or K2 is closed (enabled). Table 7 shows a similar function for input devices like 161-nb. It may be noted that K1 is the source relay for output devices while K2 is the source relay for input devices.

TABLE 6

| Eat Bus Function For Output Devices | | |
|---|---|---|
| Relay | | |
| K1 (SRCON) | K2 (DSTON) | Function |
| Disable | Disable | Normal - Output signal is conncected to I/O pins; EAT Bus is floating. |

TABLE 6-continued
Eat Bus Function For Output Devices

| K1 (SRCON) Relay | K2 (DSTON) | Function |
|---|---|---|
| Enable | Disable | EAT - Output signal is connected to EAT Bus and disconnected from I/O pins. The output signal can now be used as an input to some other complementary device. |
| Disable | Enable | New Source - Output signal is disconnected from device and not used. I/O lines are connected to EAT Bus to be driven by some other device. |
| Enable | Enable | Monitor - Output signal is connected to EAT Bus and to I/O pins; thus, allowing another input device to monitor the output device |

TABLE 7
EAT Bus Function for Input Devices

| K1 (DSTON) Relay | K2 (SRCON) | Function |
|---|---|---|
| Disable | Disable | Normal - input signal is connected to I/O pins; EAT Bus is floating. |
| Enable | Disable | EAT - Input signal is connected to EAT Bus and disconnected from I/O pins. The input signal can now be used as an output to some other complementary device. |
| Disable | Enable | New Destination - Input signal is disconnected from device and device is not used. I/O lines are connected to EAT Bus and thus to some other destination device. |
| Enable | Enable | Monitor - Input signal is connected to EAT Bus and to I/O pins; thus, allowing another input device to monitor the input signal (similar to Online test). |

Relays are preferred to be used for connection to the EAT Bus for the following reasons:

(1) The EAT bus is directly connected to all 4096 (possible) devices and the loading characteristics would be significant if not dominant for most precision circuits.
(2) The open switch (relay) must be able to withstand the worst voltage of any other devices (115 VRMS).
(3) The relay's normal failure mode still allows a system to operate.
(4) Negligible IR drop will minimize test errors.

4.4 Source Logic

The source logic is performed by circuits shown in FIG. 20. The source logic circuits 170 allow only one source to be connected to the EAT Bus at any one time. The source logic allows a connection to occur if the following are true at the time a "test connect" command is issued: (1) Signals TEST1, TEST2, and TEST3 are all low and (2) TESTIN is high. If a "test connect" command is received the source logic will perform the following:

(1) Open the connection from TESTIN to TESTOUT.
(2) Assert one and only one of the three TEST lines.
(3) Generate an 8 ms ±20% delay before connecting relays K1 or K2 (166 or 167 in FIG. 24) to the EAT Bus.
(4) Assert the TESTDIS signal.

All relays will open if any of the following occurs:

(1) TESTIN goes low
(2) A "disconnect" command is received
(3) Master Reset CMBR (or device Reset RESET) is asserted.

As shown in FIG. 20, the TEST 1, 2 and 3, Converter Bus lines produce E1, E2 and E3 in the array 130 via receivers 171, 172 and 173 and NOR gate 174. When the TESTIN line is high, line receiver 175 resets flip-flop 176 and initiates EO* from array 130, which sets 176, producing its Q output to one shot multivibrator 177. After an 8 ms delay, the output of 177 sets flip-flop 178 which produces SRCON at its Q output and SRCON* at its Q output, which turns on the K1 relay drive circuit 179. Thus, switch K1 is switched connecting the output driver or input receiver of the conversion device to the EAT Bus and opening the connection from TESTIN to TESTOUT and asserting TESTDIS to the master controller over the Converter Bus, via diodes 180.

4.5 Destination Logic

The destination logic is also shown in FIG. 20. If there are multiple converter devices on one module, like module *n shown in FIG. 11, special multiple device destination logic circuits (not shown) should be used. Those curcuits allow several destination relays to be connected simultaneously. The destination logic should allow connections to occur when: the correct TEST signal is high as described in table 5 and all other TEST signals are low.

When a valid destination "test connect" command is received, as determined by logic circuits 181, the destination logic should immediately produce DSTON which activates the destination relays controlling switch K2. When a valid destination command is received on the lines TEST 1, 2 and 3, an output from multiple input AND gate 182 is initiated to flip-flop 183, which produces DSTON at its Q output. The DSTON signal turns on relay driver 184 for the switch K2 relay driver, driving the switch to its enable position. In any event, all relays will open when: any of the three TEST signal levels changes or a "test disconnect" command is received, or Master Reset (or device Reset) is asserted.

5.0 MCU Converter Bus Controller

The structure and operation of MCU controller, also called the Converter Bus master (such as 25) is illustrated by FIG. 25. As already mentioned, the MCU controller is a Processor Bus device and so it couples to the Processor Bus 3 via a standard Processor Bus interface that includes the circuits described herein particularly under section 2.5.4 (Processor Device Standard Interface) and shown in FIGS. 5 to 10. The MCU controller function circuits, equivalent to 56 in FIG. 5 include the a microprocessor unit (MPU), denoted 200.

The commands of Processor Bus devices to read or write to converter devices are received by line receivers in the standard Processor Bus interface 201 and coupled to the controller microprocessor unit (MPU) 200 which may be a 68000. PBCLK and PBSYNC on the Processor Bus are also fed to MPU 200 at the points in the controller where indicated.

The protocol and procedures followed for a processor device to address the controller to read or write data to a converter device are the same as between any two processor devices. The MPU 200 is programmed to initiate and carry out all EAT Bus operation and testing of the complementary I/O converter devices.

Addressing a converter device in response to a command from a processor device master of the Processor Bus is accomplished by the MCU controller Converter Bus address interface circuits 202 and data flow is controlled by data interface circuits 203. In 202, the converter device address A23-A00 from MPU 200 is decoded in two steps by decoders 204 and 205 producing CBCCS* and CBEN* to programmable logic array (PLA) 206. Array 206 also receives WRT* from MPU 200 and INTRQST* from flip-flop 207 in response to CBIRQ* from Converter Bus 5. The outputs of PLA 206, denoted Q0 to Q7 are asserted to the Converter Bus by drivers 208 as shown and include all timing and command signals to the Converter Bus from the controller.

Data flow between the controller MPU 200 and the Converter Bus is controlled, transmitted and received by controller interface circuits 203. Data to or from converter devices designated D15-D00 the MPU is transmitted or received by T/R circuit 210 depending upon the R/W* signal from MPU 200. In series with T/R 210 is another T/R circuit 211 that transmits the data from 210 to the Converter Bus via driver 212 along with the converter device address CBA21-CBA00 from line 213 through gate depending on the output state of NAND gate 215 (when BDE* is present, but CBEN* is not). Driver 212 is controlled by the output CBOUT* of NOR gate 216. The two inputs of NOR gate 216 are the output of NAND gate 215 and the oputput of NAND gate 217 which is fed CBWR and CBDE from MPU 200.

Meanwhile the address CBA23-CBA00 from 214 is fed to the D terminal of latch 220 where it is latched and put on the data line between the T/R's 211 and 210 upon the Converter Bus strobe CBSTB*. Latch 220 is cleared by the output of NAND gate 221 (READINT*) which is fed CBCCS* and RD*. Flip-flop 222 is set by CBSTB* and produces IPL to MPU 200 and is reset by READINT*.

All logic gates shown in FIG. 25 are represented by standard IEEE symbols and their functions are well through. The descriptions above and descriptions elsewhere herein do not specifically identify by reference numbers all of the gates shown. In those cases, it should be understood that the construction and function of all gates shown by standard IEEE symbols as well as inverters (I), flip-flop circuits (F-F) and decoders D/C are in accordance with well known prior art standards for for the same.

CONCLUSIONS

The computer system described herein as a representative embodiment of the present invention incorporates all of the features of the invention and is particularly suitable for processing analog and digital data input signals in a comprehensive data acquistion, processing and control system. A explained herein in relationship to the embodiment, data acquisition, processing and control systems are often custom designed for a very particular purpose and, heretofor, such systems have not incorporated a standard common architecture. The embodiment of the present invention incorporates an architecture that can interface an almost unlimited number of analog and digital input and output converter modules, some of which operate at relatively very low speeds, and interface and coordinate these with any of the relatively high speed digital processing modules. The architecture is the Bus Oriented Synchronous System, herein called BOSS, which means that the relatively high speed Processor Bus and the relatively lower speed Converter Bus are synchronized and both have the same generic Bus timing and protocol that is not intimately tied to any particular interface hardware and so the input and output modules on the Converter Bus can be arranged, added to and substituted for, depending on the particular purpose of the system, without changing any of the bus protocol. Furthermore, the various processor devices can be arranged, added to and and substituted for, depending upon the purpose and function of the total system, without requiring any change in the bus timing protocol and synchronism between the busses. These features and other advantages of the BOSS architecture can be incorporated in systems other than the particular system described herein as the embodiment, without deviating from the spirit and scope of the invention as set forth in the appended claims.

What is claimed is:

1. A signal processing system for processing at relatively high digital signal rates a plurality of input signals from sources received at relatively low signal rates, and producing output signals for utilization devices comprising,
    (a) a plurality of input signal coverter modules for receiving and converting the system input signals into digital signals, herein called converted input signals,
    (b) a plurality of output signal converter modules for converting the system output signals for use by the utilization devices,
    (c) a synchronously operating converter module bus for said converter modules including one or more address lines, data lines, control lines and a clock line, to which said converter modules interface,
    (d) a plurality of digital signal processor devices that operate at relatively high digital signal rates, each adapted for generating, receiving and processing addresses, data, timing and control signals that are exchanged between said processor devices and each adapted for processing said converted input signals,
    (e) a synchronously operating processor device bus for said processor devices to which said processor devices interface, including a plurality of processor device address lines, data lines and timing and control lines for conducting addresses, data, timing and control signals, respectively, between said processor devices,
    (f) a source of processor bus clock signals,
    (g) means for coupling said processor bus clock signals to said processor bus timing line,
    (h) a source of converter bus clock signals,
    (i) means for coupling said converter bus clock signals to said converter bus clock line and
    (j) a converter bus controller device that interfaces to said processor bus and interfaces to said converter bus for controlling the flow of converted input signals from said converter modules to said processor devices,
    (k) whereby, the system accommodates relatively high-speed processing in said processor devices and between processor devices over said processor bus and relatively low-speed signal flow of converted input signals through said converter bus to said controller, while continually receiving input signals from said sources at said converter modules at relatively low signal rates.

2. A system as in claim 1 including more than one converter bus, like said converter bus, each with one or more converter modules, like said converter modules interfaced thereto and a converter bus controller device, like said converter bus controller device for each such converter bus that interfaces to said processor bus and interfaces to such converter bus for controlling signal flow of converted input signals from converter modules on said converter bus.

3. A system as in claim 1 including more than one processor bus, like said processor bus, each with one or more processor devices, like said processor devices, interfaced thereto and means for coupling said processor buses together so that the processor devices on different processor buses can exchange data.

4. A system as in claim 2 including more than one processor bus, like said processor bus, each with one or more processor devices, like said processor devices, interfaced thereto and means for coupling said processor buses together so that the processor devices on different processor buses can exchange data.

5. A system as in claim 3 wherein at least two of said processor buses receives clock signals from the same source.

6. A system as in claim 4 wherein at least two of said processor buses receive clock signals from the same source.

7. A system as in claim 3 wherein at least two of said processor buses have different sources of clock signals.

8. A system as in claim 4 wherein at least two of said processor buses have different sources of clock signals.

9. A system as in claim 1 for processing and producing output signals as well as input signals and further including,
   (a) one or more output signal converter modules that interface to said converter bus for converting data signals received over the converter bus from the processor devices to system output sigtnals and
   (b) said converter bus controller device controls the flow signals from the processor devices to said output signal converter modules.

10. A system as in claim 1 wherein an input and an output converter module are complementary to each other.

11. A system as in claim 1 and further including,
   (a) a test bus to which interface said complementary converter modules,
   (b) means coupled thereto for feeding the output of one of said complementary modules to the input of the other while comparing the input of the one to the output of the other, and
   (c) means for indicating a fault when the signals compared are not the same.

12. A system as in claim 1 wherein each of said processor devices includes interface circuits by which it interfaces to said processor bus, receives the clock signals, generates said address, data, timing and control signals and drives the same to the corresponding processor bus lines for transmission from it to the interface circuits of the other processor devices on said processor bus.

13. A system as in claim 12 wherein said timing signals include a processor bus cycle signal such that each processor bus cycle signal includes in integer number of processor bus clock pulse cycles.

14. A system as in claim 13 wherein said control signals includes:
   (a) a signal (PBREQ) signifying that the processor device generating PBREQ requires use of the processor bus during the current processor bus cycle as the master of the processor bus and
   (b) a signal (PBENO) during the bus cycle following the current processor bus cycle signifying that the processor device generating PBENO no longer requires to be master of the processor bus.

15. A system as in claim 14 wherein said interface circuits of each processor device includes:
   (a) means for receiving said signal PBREQ from other processor devices and
   (b) means for inhibiting its interface circuits from asserting its own PBREQ signal on the processor bus.

16. A system as in claim 15 wherein said interface circuits of each processor device includes:
   (a) means for signalling to the processor device that is next lower in priority to it a priority signal (PBENO) signifying that it is asserting PBREQ to the processor bus,
   (b) means for receiving a signal PBENO from the processor device that is next higher priority to it and
   (c) means responsive to said receiving means for inhibiting its assertion of PBREQ.

17. In a signal processing system for processing at relatively high digital signal rates a plurality of input signals from sources received at relatively low signal rates, and producing output signals for utilization devices at relatively low signal rates, the improvement comprising,
   (a) a plurality of input signal converter modules for receiving and converting the system input signals into digital signals, herein called converted input signals,
   (b) a plurality of output signal converter modules for converting the system output signals for use by the utilization devices,
   (c) a synchronously operating converter module bus for said converter modules to which said converter modules interface,
   (d) a plurality of digital signal processor devices that operate at relatively high digital signal rates
   (e) a synchronously operating processor devices bus for said processor devices to which said processor devices interface,
   (f) a source of relatively high rate processor bus clock signals,
   (g) means for coupling said processor bus clock signals to said processor bus,
   (h) a source of relatively lower rate converter bus clock signals,
   (i) means for coupling said converter bus clock signals to said converter bus and
   (j) a converter bus controller device that interfaces to said processor bus and interfaces to said converter bus for controlling the flow of converted input signals from said input converter modules to said processor devices and for controlling the flow of said output signals to said output converter modules,
   (k) whereby, the system accommodates relatively high-speed processing in said processor devices and between processor devices over said processor bus and relatively low-speed signal flow of converted input signals from said input converter modules and output signals to said output converter modules.

18. A system as in claim 17 including more than one converter bus, like said converter bus, each with one or more converter modules, like said converter modules interfaced thereto and a converter bus controller device, like said converter bus controller device for each such converter bus that interfaces to the processor bus and interfaces to such converter bus for controlling signal flow of converted input signals from converter modules on said converter bus.

19. A system as in claim 17 including more than one processor bus, like said processor bus, each with one or more processor devices, like said processor devices, interfaced thereto and means for coupling said processor buses together so that the processor devices on different processor buses can exchange data.

20. A system as in claim 18 including more than one processor bus, like said processor bus, each with one or more processor devices, like said processor devices, interfaced thereto and means for coupling said processor buses together so that the processor devices on different processor buses can exchange data.

* * * * *